(12) United States Patent
Ryu et al.

(10) Patent No.: US 12,015,196 B2
(45) Date of Patent: Jun. 18, 2024

(54) ELECTRONIC DEVICE WITH ANTENNA

(71) Applicant: LG ELECTRONICS INC., Seoul (KR)

(72) Inventors: Seungwoo Ryu, Seoul (KR); Joohee Lee, Seoul (KR); Junyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 17/594,732

(22) PCT Filed: Jul. 26, 2019

(86) PCT No.: PCT/KR2019/009354
§ 371 (c)(1),
(2) Date: Oct. 27, 2021

(87) PCT Pub. No.: WO2021/020599
PCT Pub. Date: Feb. 4, 2021

(65) Prior Publication Data
US 2022/0216602 A1 Jul. 7, 2022

(51) Int. Cl.
*H01Q 1/36* (2006.01)
*H01Q 1/24* (2006.01)
*H01Q 21/06* (2006.01)

(52) U.S. Cl.
CPC .............. *H01Q 1/36* (2013.01); *H01Q 1/24* (2013.01); *H01Q 21/06* (2013.01)

(58) Field of Classification Search
USPC ........................................................ 343/893
See application file for complete search history.

(56) References Cited

U.S. PATENT DOCUMENTS

| 5,389,937 A * | 2/1995 | Kaloi | H01Q 19/005 343/700 MS |
| 9,419,346 B2 * | 8/2016 | Yoon | H01Q 9/42 |

(Continued)

FOREIGN PATENT DOCUMENTS

| CN | 102709673 | 10/2012 |
| CN | 103296388 | 9/2013 |

(Continued)

OTHER PUBLICATIONS

State Intellectual Property Office of the People's Republic of China Application Serial No. 202010236177.7, Office Action dated Oct. 24, 2022, 10 pages.

(Continued)

*Primary Examiner* — Hoang V Nguyen
*Assistant Examiner* — Brandon Sean Woods
(74) *Attorney, Agent, or Firm* — LEE, HONG, DEGERMAN, KANG & WAIMEY

(57) ABSTRACT

An electronic device with an antenna, according to the present invention, has a cone antenna comprising: a cone radiator which is provided between a first substrate and a second substrate, has the upper part thereof connected to the first substrate and the lower part thereof connected to the second substrate, and has an opening at the upper part; a metal patch formed on the first substrate and spaced apart from the upper opening; and a shorting pin formed to electrically connect the metal patch and a ground layer of the second substrate. The electronic device may further comprise a transceiver circuit which is connected to the cone radiator via a feed and controls so as to radiate a signal via the cone antenna. Accordingly, the size of the entire antenna can be minimized by arranging the metal patch on only one side of the upper opening of the cone antenna.

10 Claims, 28 Drawing Sheets

(56) References Cited

U.S. PATENT DOCUMENTS

| | | | |
|---|---|---|---|
| 10,074,909 B2* | 9/2018 | Su | H01Q 21/205 |
| 11,765,986 B2* | 9/2023 | Topaloglu | B82Y 10/00 |
| | | | 257/31 |
| 2010/0085264 A1 | 4/2010 | Du et al. | |
| 2012/0306710 A1 | 12/2012 | Mishan et al. | |
| 2015/0357720 A1* | 12/2015 | Chen | H01Q 21/28 |
| | | | 343/727 |
| 2016/0372823 A1 | 12/2016 | Yoon et al. | |
| 2018/0358697 A1* | 12/2018 | Zhou | H01Q 9/0421 |

FOREIGN PATENT DOCUMENTS

| | | | |
|---|---|---|---|
| CN | 103972657 | | 8/2014 |
| CN | 106785365 | | 5/2017 |
| CN | 108321535 | | 7/2018 |
| CN | 207818880 | | 9/2018 |
| CN | 207818880 U | * | 9/2018 |
| CN | 109088150 | | 12/2018 |
| CN | 112310621 | | 2/2021 |
| JP | 2004236248 | | 8/2004 |
| KR | 101850061 | | 6/2018 |
| KR | 101888399 | | 8/2018 |
| WO | 2006022350 | | 3/2006 |
| WO | 2017096420 | | 6/2017 |

OTHER PUBLICATIONS

PCT International Application No. PCT/KR2019/009354, International Search Report dated Apr. 24, 2020, 4 pages.

* cited by examiner

ELECTRONIC DEVICE WITH ANTENNA

CROSS-REFERENCE TO RELATED APPLICATIONS

This application is the National Stage filing under 35 U.S.C. 371 of International Application No. PCT/KR2019/009354, filed on Jul. 26, 2019, the contents of which are all incorporated by reference herein in their entirety.

TECHNICAL FIELD

The present disclosure relates to an electronic device having a wideband antenna. More particularly, the present disclosure relates to an electronic device having a cone antenna operating from a low frequency band to a frequency band of 5 GHz.

BACKGROUND

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mm-Wave) band in addition to the Sub-6 band for faster data rate.

Accordingly, a broadband antenna operating in both the LTE frequency band and the 5G Sub-6 frequency band needs to be disposed in the electronic device. However, the broadband antenna such as the cone antenna has problems in that an overall antenna size thereof increases and a weight thereof increases.

Furthermore, the broadband antenna such as the cone antenna may be implemented in a three-dimensional structure compared to a planar antenna in the related art. Accordingly, there is a problem in that there is no specific arrangement structure for arranging the cone antenna having such a three-dimensional structure in the electronic device.

SUMMARY

An aspect of the present disclosure is to solve the above-mentioned problems and other problems. Furthermore, another aspect of the present disclosure is to provide an electronic device having a broadband antenna element operating from a low frequency band to a 5 GHz band.

Still another aspect of the present disclosure is to provide an electronic device in which a plurality of antenna elements operating from a low frequency band to a 5 GHz band are arranged.

Yet still another aspect of the present disclosure is to provide an antenna structure capable of reducing a size of an antenna element operating from a low frequency band to a 5 GHz band.

In order to achieve the foregoing or other objectives, an electronic device having an antenna according to the present disclosure is provided. The electronic device may include a cone antenna including a cone radiator provided between a first substrate and the second substrate, an upper part of which is connected to the first substrate, a lower part of which is connected to the second substrate, and provided with an aperture on the upper part; a metal patch disposed on the first substrate to be spaced apart from the upper aperture; and a shorting pin disposed to electrically connect the metal patch and a ground layer of the second substrate. In addition, the electronic device may further include a transceiver circuit connected to the cone radiator through a power feeder to control a signal to be radiated through the cone antenna. Accordingly, the metal patch may be disposed on only one side of the upper aperture of the cone antenna, thereby minimizing an entire size of the antenna.

According to an embodiment, the shorting pin may be defined as a single shorting pin between the metal patch and the second substrate, and a null of a radiation pattern of the cone antenna may be prevented from being generated by the single shorting pin.

According to an embodiment, the electronic device may further include the power feeder disposed on the second substrate, and configured to transmit the signal through a lower aperture, wherein an end portion of the power feeder is defined in a ring shape to correspond to a shape of the lower aperture.

According to an embodiment, the electronic device may further include a fastener configured to be connected to the second substrate through an inside of the end portion of the power feeder, wherein the second substrate on which the power feeder is disposed and the cone radiator are fixed through the fastener.

According to an embodiment, the metal patch may be disposed only on one side so as to surround a partial region of an upper opening of the cone antenna to minimize a size of the cone antenna including the metal patch.

According to an embodiment, the metal patch may be disposed on both one side and the other side corresponding to the one side so as to surround an entire region of the upper opening of the cone antenna.

According to an embodiment, the electronic device may further include at least one non-metal supporter configured to vertically connect the first substrate and the second substrate so as to support the first substrate and the second substrate.

According to an embodiment, one of the non-metal supporters may be disposed on a metal patch disposed on the other side, and a null of a radiation pattern of the cone antenna may be prevented from being generated by a single shorting pin disposed on a metal patch disposed on the one side.

According to an embodiment, the metal patch may be disposed as a rectangular patch having an outer side shape in a rectangular form, and an inner side shape of the rectangular patch may be defined in a circular shape to correspond to a shape of an outer line of the upper aperture so as to allow a signal radiated from the cone antenna to be coupled through an inner side of the rectangular patch.

According to an embodiment, the metal patch may be disposed as a circular patch having an outer side shape in a circular form, and an inner side shape of the circular patch may be defined in a circular shape to correspond to an outer shape of the upper aperture so as to allow a signal radiated from the cone antenna to be coupled through an inner side of the circular patch.

According to an embodiment, the metal patch may include a first metal patch disposed at a left side of the upper aperture to surround the upper aperture of the cone antenna; and a second metal patch disposed at a right side of the upper aperture to surround the upper aperture of the cone antenna.

According to an embodiment, the first metal patch and the second metal patch may be disposed to allow the metal patterns to be separated from each other, and the first metal patch and the second metal patch may not be disposed in a region corresponding to an outer rim constituting the upper aperture to allow the cone antenna to operate as a broadband antenna.

According to an embodiment, the cone antenna may be defined in a tapered conical form such that an upper diameter thereof is greater than a lower diameter thereof, and the cone antenna may be defined in a hollow conical form.

According to an embodiment, the cone antenna may further include an outer rim configured to constitute the upper aperture of the cone antenna and to connect the cone antenna to the first substrate; and a fastener configured to connect the outer rim and the first substrate. On the other hand, the cone antenna may be mechanically fastened to the first substrate through two fasteners on opposing regions of the outer rim.

An electronic device having an antenna according to another aspect of the present disclosure may include a cone antenna may include a cone radiator configured to connect a first substrate and a second substrate spaced apart from the first substrate by a predetermined gap, and provided with an upper aperture and a lower aperture, a metal patch disposed on the first substrate, and spaced apart from the upper aperture, and a power feeder disposed on the second substrate, and configured to transmit a signal through the lower aperture. Furthermore, the electronic device may further include a transceiver circuit connected to the cone radiator through the power feeder to control a signal to be radiated through the cone antenna.

According to an embodiment, the cone antenna may be implemented with a plurality of cone antennas disposed on an upper left, an upper right, a lower left and a lower right of the electronic device. On the other hand, the electronic device may include a processor that controls an operation of the transceiver circuit, wherein the processor controls the transceiver circuit to perform multi-input multi-output (MIMO) through the plurality of cone antennas.

According to an embodiment, the electronic device may further include a shorting pin that connects between the metal patch and a ground layer of the second substrate. On the other hand, an end portion of the power feeder may be defined in a ring shape to correspond to a shape of the lower aperture.

According to an embodiment, the shorting pin may be defined as a single shorting pin between the metal patch and the second substrate, and a null of a radiation pattern of the cone antenna may be prevented from being generated by the single shorting pin.

According to an embodiment, the electronic device may further include a fastener configured to be connected to the second substrate through an inside of the end portion of the power feeder, wherein the second substrate on which the power feeder is disposed and the cone radiator are fixed through the fastener.

According to an embodiment, the metal patch may be disposed only on one side so as to surround a partial region of an upper opening of the cone antenna to minimize a size of the cone antenna including the metal patch.

According to the present disclosure, a hollow cone antenna may be disposed in an electronic device, thereby having an advantage capable of reducing a weight of the electronic device.

Furthermore, according to the present disclosure, a metal patch disposed adjacent to the cone antenna may be connected to a single shorting pin, thereby having an advantage capable of improving reception performance in almost all directions.

Furthermore, according to the present disclosure, the cone antenna having the shorting pin and the metal patch may be connected between an upper and lower substrates in the electronic device, thereby having an advantage capable of allowing a broadband antenna to be disposed in the electronic device.

Furthermore, according to the present disclosure, the metal patch may be disposed on only one side of an upper aperture of the cone antenna, thereby having an advantage capable of minimizing an overall size of the antenna.

Furthermore, according to the present disclosure, metal patches with various shapes may be disposed around an upper aperture of the cone antenna, thereby having an advantage capable of providing a broadband antenna with an optimal structure according to the operating frequency and design conditions of the antenna.

Furthermore, according to the present disclosure, a region where the metal patch is disposed in an upper region of the cone antenna and the number of shorting pins may be optimized, thereby having an advantage capable of optimizing the characteristics of the antenna as well as minimizing the overall size of the antenna.

Further scope of applicability of the present disclosure will become apparent from the following detailed description. However, it should be understood that the detailed description and specific examples such as preferred embodiments of the invention are given by way of illustration only, since various changes and modifications within the spirit and scope of the invention will become apparent to those skilled in the art from this detailed description.

DETAILED DESCRIPTION

Figure 1A:
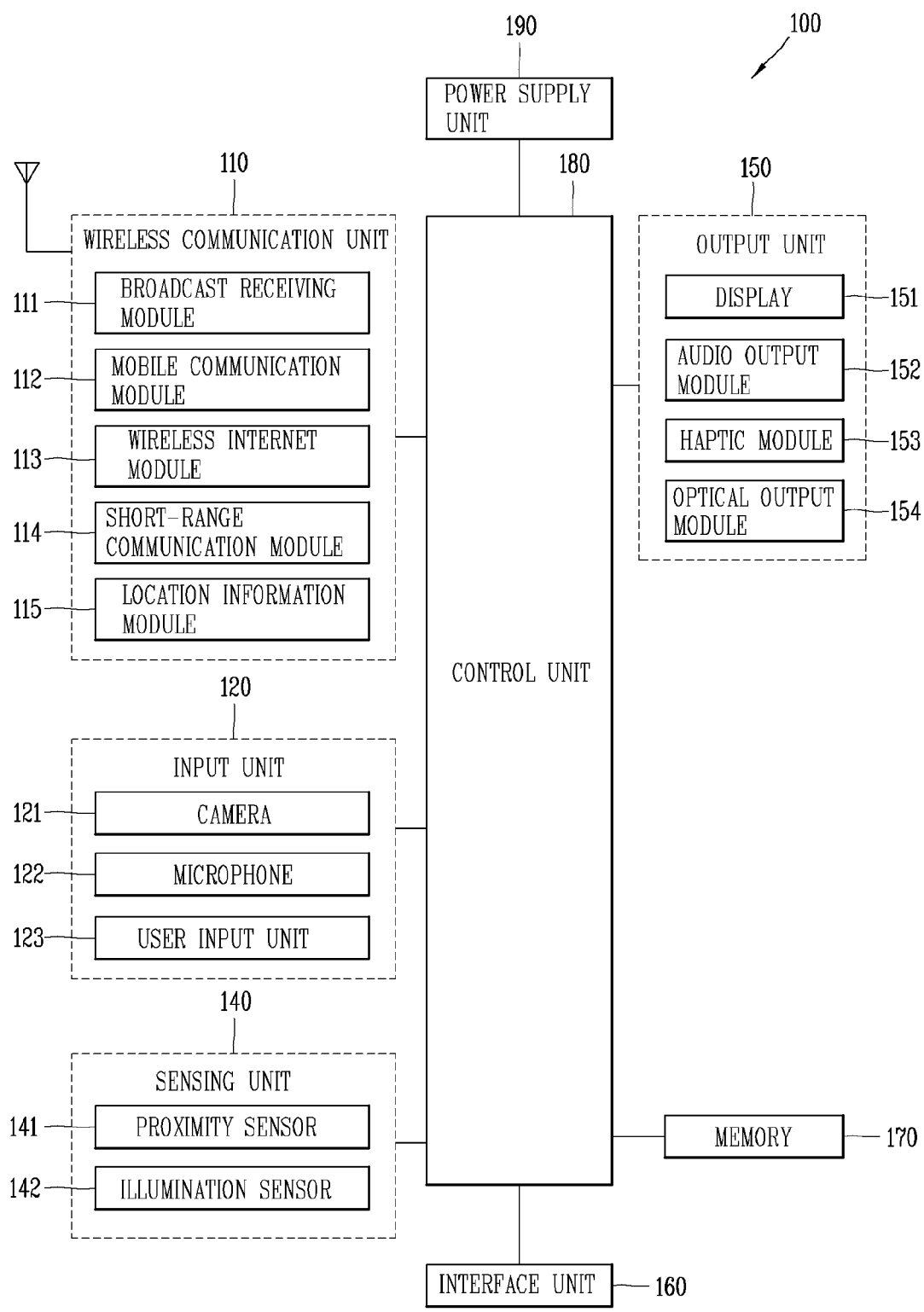
FIG. 1A is a block diagram of an electronic device in accordance with one exemplary implementation of the present disclosure.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the main point of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
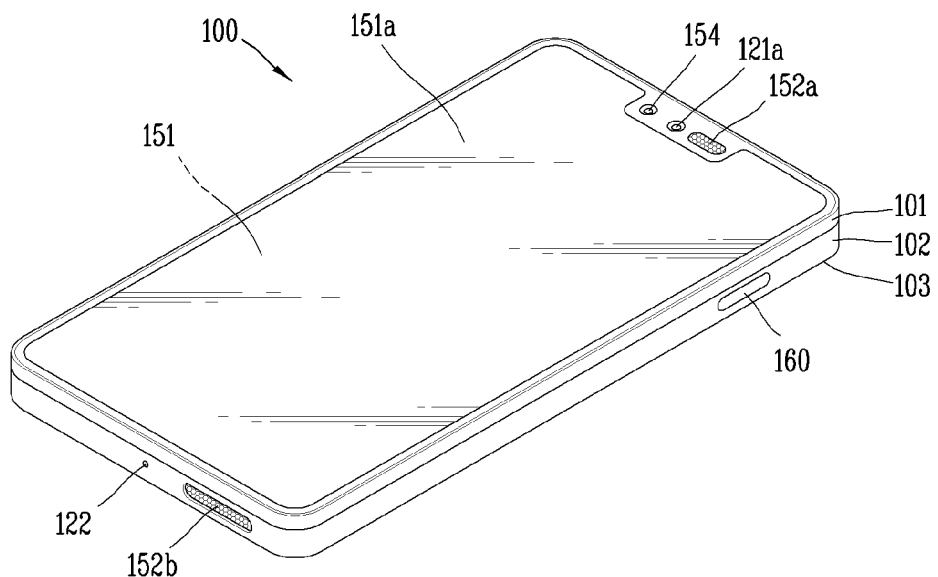
FIGS. 1B and 1C are conceptual views illustrating one example of an electronic device, viewed from different directions.
Figure 1C:
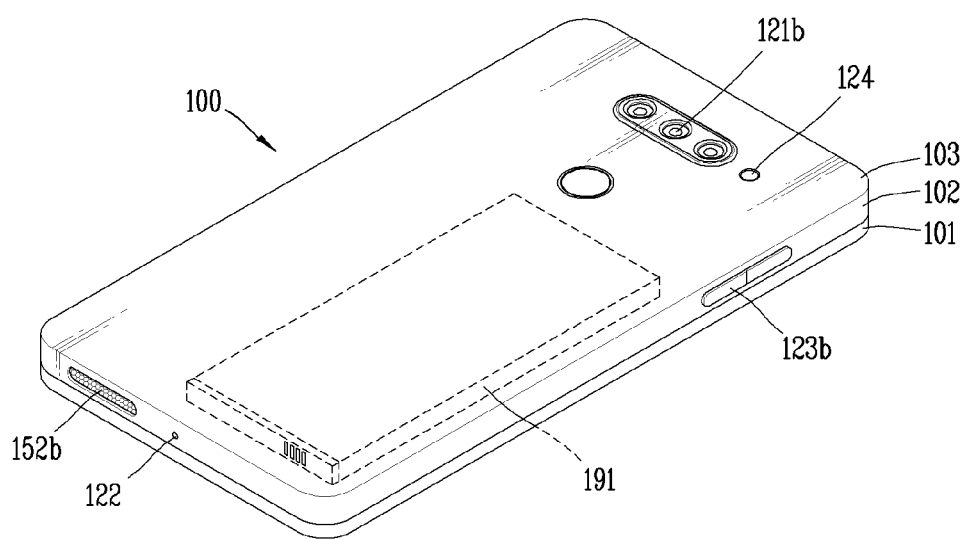

Referring to FIGS. 1A to 1C, FIG. 1A is a block diagram of an electronic device in accordance with one exemplary implementation of the present disclosure, and FIGS. 1B and 1C are conceptual views illustrating one example of an electronic device, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be a 4G communication network and a 5G communication network, for example.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) multi-input multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. Meanwhile, a Sub-6 frequency band, which is a range of 6 GHz or less, may be used as the 5G frequency band.

On the other hand, a millimeter wave (mmWave) range may be used as the 5G frequency band to perform broadband high-speed communication. When the mmWave band is used, the electronic device 100 may perform beam forming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement is achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. One example of the wireless area networks is a wireless personal area network.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and the WiFi communication module 113. In this regard, 4G+WiFi CA may be performed using the 4G wireless communication module 111 and the Wi-Fi communication module 113. Or, 5G+WiFi CA may be performed using the 5G wireless communication module 112 and the WiFi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100, under the control of the controller 180. The power supply unit 190 may include a battery, and the battery may be configured to be embedded in the terminal body, or configured to be detachable from the terminal body.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIGS. 1B and 1C, the disclosed electronic device 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this implementation, the electronic device 100 may include a front case 101 and a rear case 102. Various electronic components are interposed into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 so as to form the front surface of the terminal body together with the front case 101.

In some implementations, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. Meanwhile, the rear cover 103 may include an opening for externally exposing a camera 121b or an audio output module 152b.

The electronic device 100 may include a display 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a controller 180 may generate a control command corresponding to the touch. Contents input in the touch manner may be characters, numbers, instructions in various modes, or a menu item that can be specified.

In this way, the display 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The optical output module 154 may output light for indicating an event generation. Examples of the event may include a message reception, a call signal reception, a missed call, an alarm, a schedule notice, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display 151 or the user input unit 123.

The microphone 122 may be provided at a plurality of places, and configured to receive stereo sounds. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of implementations of a multi-transmission system and an electronic device having the same, specifically, a power amplifier in a heterogeneous radio system and an electronic device having the same according to the present disclosure, with reference to the accompanying drawings. It will be apparent to those skilled in the art that the present disclosure may be embodied in other specific forms without departing from the spirit or essential characteristics thereof.

Figure 2:
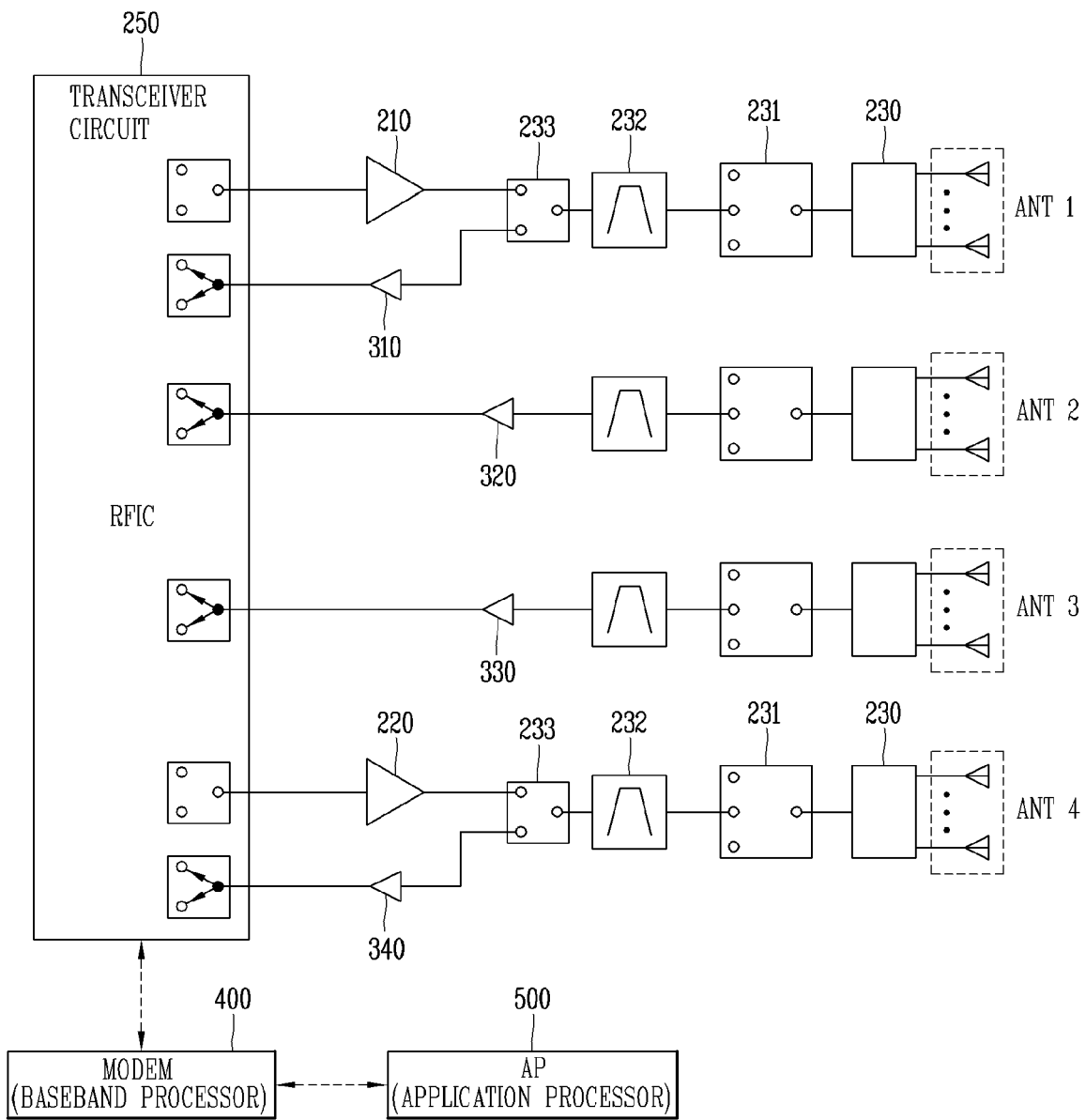
FIG. 2 is a block diagram illustrating a configuration of a wireless communication unit of an electronic device operable in a plurality of wireless communication systems according to an implementation.

FIG. 2 is a block diagram illustrating a configuration of a wireless communication unit of an electronic device operable in a plurality of wireless communication systems according to an implementation. Referring to FIG. 2, the electronic device includes a first power amplifier 210, a second power amplifier 220, and an RFIC 250. In addition, the electronic device may further include a modem 400 and an application processor (AP) 450. Here, the modem 400 and the application processor (AP) 450 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 410 to 440 in the receiver. Here, the first power amplifier 210, the second power amplifier 220, the RFIC 250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but the present disclosure is not limited thereto. The RFIC 250 may be configured as a 4G/5G separated type according to an application. When the RFIC 250 is configured as the 4G/5G integrated type, it has advantages in terms of synchronization between 4G and 5G circuits and simplification of control signaling by the modem 400.

On the other hand, when the RFIC 250 is configured as the 4G/5G separated type, the separated RFIDs may be referred to as 4G RFIC and 5G RFIC, respectively. In particular, when there is a great difference between a 5G band and a 4G band, such as a case where the 5G band is configured as a mmWave band, the RFIC 250 may be configured as the 4G/5G separated type. As such, when the RFIC 250 is configured as the 4G/5G separated type, RF characteristics can be optimized for each of a 4G frequency band and a 5G frequency band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 450 is configured to control the operation of each component of the electronic device. Specifically, the application processor (AP) 450 may control the operation of each component of the electronic device through the modem 400.

For example, the modem 400 may be controlled through a power management IC (PMIC) for low power operation of the electronic device. Accordingly, the modem 400 may control power circuits of a transmitter and a receiver to operate in a low power mode through the RFIC 250.

In this regard, when it is determined that the electronic device is in an idle mode, the application processor (AP) 450 may control the RFIC 250 through the modem 400 as follows. For example, when the electronic device is in an idle mode, the application processor 280 may control the RFIC 250 through the modem 400, such that at least one of the first and second power amplifiers 110 and 120 operates in the low power mode or is turned off.

According to another implementation, the application processor (AP) 450 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 450 may control the modem 400 to enable wireless communication at the lowest power. Accordingly, the application processor (AP) 450 may control the modem 400 and the RFIC 250 to perform short-range communication using only the short-range communication module 113, even at the expense of throughput.

According to another implementation, when the remaining battery level of the electronic device is above the threshold, the modem 400 may be controlled to select an optimal wireless interface. For example, the application processor (AP) 450 may control the modem 400 to receive data through both the 4G base station and the 5G base station according to the remaining battery level and the available radio resource information. In this case, the application processor (AP) 450 may receive the remaining battery information from the PMIC, and the available radio resource information from the modem 400. Accordingly, when the remaining battery level and the available radio resources are sufficient, the application processor (AP) 450 may control the modem 400 and the RFIC 250 to receive data through both the 4G base station and the 5G base station.

Meanwhile, a multi-transceiving system of FIG. 2 may integrate a transmitter and a receiver of each radio system into one transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the other hand, the multi-transceiving system as illustrated in FIG. 2 has advantages of controlling different communication systems according to necessity and minimizing system delay, which may result in enabling efficient resource allocation.

Meanwhile, the first power amplifier 210 and the second power amplifier 220 may operate in at least one of the first and second communication systems. In this regard, when the 5G communication system operates in a 4G band or a sub-6 band, the first and second power amplifiers 1210 and 220 may operate in both the first and second communication systems.

On the contrary, when the 5G communication system operates in a millimeter wave (mmWave) band, the first and second power amplifiers 210, 220 may operate in either the 4G band and the other in the millimeter wave band.

On the other hand, a transmitter and a receiver may be integrated to implement two different wireless communication systems using a single antenna using a dual transmit/receive antenna. In this case, 4×4 MIMO may be implemented using four antennas as illustrated in FIG. 2. In this case, 4×4 DL MIMO may be performed through downlink (DL).

Meanwhile, when the 5G band is a sub-6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in either one of the 4G band and the 5G band. In this case, when the 5G band is a millimeter wave (mmWave) band, a plurality of antennas may be individually configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 210, 220 may operate in the 5G band. Meanwhile, when the 5G communication system is implemented using 4Tx, an additional power amplifier operating in the 5G band may be further provided. Alternatively, a transmission signal may be branched in each of one or two transmission paths, and the branched transmission signals may be connected to the plurality of antennas.

On the other hand, a switch-type splitter or power divider is embedded in an RFIC corresponding to the RFIC 250. Accordingly, a separate external component is not needed, thereby improving a component mounting configuration. In more detail, a single pole double throw (SPDT) type switch may be provided in the RFIC corresponding to the controller 250 to select transmitters (TXs) of two different communication systems.

Also, the electronic device operable in the plurality of wireless communication systems according to the present disclosure may further include a duplexer 231, a filter 232, and a switch 233.

The duplexer 231 is configured to isolate signals of a transmission band and a reception band from each other. In this case, signals in a transmission band transmitted through the first and second power amplifiers 210, 220 are applied to the antennas ANT1, ANT4 through a first output port of the duplexer 231. On the contrary, signals in a reception band received through the antennas ANT1 and ANT4 are received by the low noise amplifiers 310 and 340 through a second output port of the duplexer 231.

The filter 232 may be configured to pass signals in a transmission band or a reception band and block signals in the remaining bands. In this case, the filter 232 may include a transmission filter connected to the first output port of the duplexer 231 and a reception filter connected to a second output port of the duplexer 231. Alternatively, the filter 232 may be configured to pass only signals in the transmission band or only signals in the reception band according to a control signal.

The switch 233 is configured to transmit only one of the transmission signal or the reception signal. In one implementation of the present disclosure, the switch 233 may be configured as a single pole double throw (SPDT) type switch to isolate a transmission signal and a reception signal from each other using a time division duplex (TDD) scheme. Here, the transmission signal and the reception signal are signals of the same frequency band, and thus the duplexer 231 may be implemented in the form of a circulator.

Meanwhile, in another implementation of the present disclosure, the switch 233 may also be applied to a frequency division multiplex (FDD) scheme. In this case, the switch 233 may be configured as a double pole double throw (DPDT) type switch to connect or block a transmission signal and a reception signal. On the other hand, since the transmission signal and the reception signal can be isolated by the duplexer 231, the switch 233 is not always necessary.

Meanwhile, the electronic device according to an implementation may further include a modem 400 corresponding to the controller. In this case, the RFIC 250 and the modem 400 may be referred to as a first controller (or a first processor) and a second controller (a second processor), respectively. Meanwhile, the RFIC 250 and the modem 400 may be implemented as physically isolated circuits. Alternatively, the RFIC 250 and the modem 400 may be logically or functionally distinguished from each other on one physical circuit.

The modem 400 may perform control of signal transmission and reception through different communication systems using the RFID 250 and processing of those signals. The modem 400 may be acquired through control information received from the 4G base station and/or the 5G base station. Here, the control information may be received through a physical downlink control channel (PDCCH), but the present disclosure is not limited thereto.

The modem 400 may control the RFIC 250 to transmit and/or receive signals through the first communication system and/or the second communication system at a specific time and frequency resources. Accordingly, the RFIC 250 may control transmission circuits including the first and second power amplifiers 210 and 220 to transmit a 4G signal or a 5G signal at a specific time interval. In addition, the RFIC 250 may control reception circuits including the first to fourth low noise amplifiers 310 to 340 to receive a 4G signal or a 5G signal at a specific time interval.

On the other hand, a detailed operation and function of an electronic device having a broadband antenna (e.g., a cone antenna) operating in a broadband according to the present disclosure provided with a multi-transceiving system as shown in FIG. 2 will be described below.

In a 5G communication system according to the present disclosure, a 5G frequency band may include a Sub-6 band and/or an LTE frequency band higher than the LTE frequency band. As such, a broadband antenna capable of supporting both the 4G communication system and the 5G communication system needs to be provided in the electronic device. In this regard, the present disclosure provides a broadband antenna (e.g., cone antenna) capable of operating from a low frequency band to about 5 GHz band.

Figure 3:
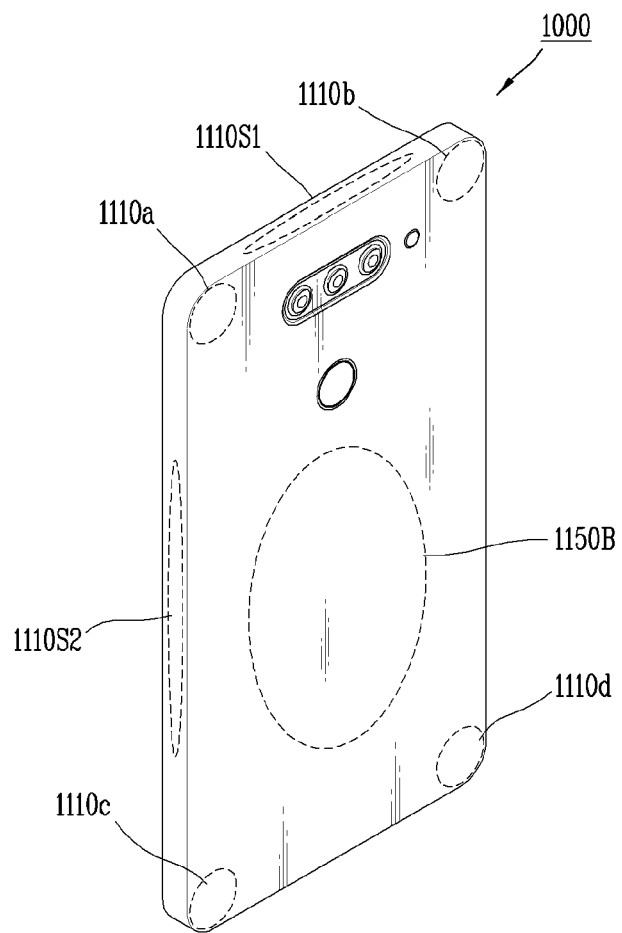
FIG. 3 is an example showing a configuration in which a plurality of antennas of an electronic device according to the present disclosure can be arranged.

FIG. 3 is an example showing a configuration in which a plurality of antennas of an electronic device according to the present disclosure can be arranged. Referring to FIG. 3, a plurality of antennas 1110a to 1110d or 1150B may be arranged on a rear surface of the electronic device 100. Alternatively, a plurality of antennas 1110S1 and 1110S2 may be disposed on a side surface of the electronic device 100. Here, the electronic device may be implemented in a communication relay apparatus, a small cell base station, a base station, or the like in addition to a user terminal (UE). Here, the communication relay apparatus may be customer premises equipment (CPE) capable of providing a 5G communication service indoors. In addition, a cone antenna according to the present disclosure may be mounted on a vehicle other than an electronic device to provide a 4G communication service and a 5G communication service.

On the other hand, referring to FIG. 2, a plurality of antennas (e.g., cone antennas) ANT 1 to ANT 4 may be arranged on a side surface or a rear surface of the electronic device 100.

Meanwhile, referring to FIGS. 2 and 3, at least one signal may be transmitted or received through the plurality of antennas 1110a to 1110d corresponding to the plurality of antennas ANT 1 to ANT 4. In this regard, each of the plurality of antennas 1110a to 1110d may be configured as a single cone antenna. The electronic device may communicate with a base station through any one of the plurality of cone antennas 1110a to 1110d. Alternatively, the electronic device may perform multi-input multi-output (MIMO) communication with the base station through two or more antennas among the plurality of cone antennas 1110a to 1110d.

Meanwhile, the present disclosure may transmit or receive at least one signal through the plurality of antennas 1110S1 and 1110S2 on a side surface of the electronic device 100. Unlike the drawings, at least one signal may be transmitted or received through the plurality of cone antennas 1110S1 to 1110S4 on a side surface of the electronic device 100. On the other hand, the electronic device may communicate with the base station through any one of the plurality of cone antennas 1110S1 to 1110S4. Alternatively, the electronic device may perform multi-input multi-output (MIMO) communication with the base station through two or more antennas among the plurality of cone antennas 1110S1 to 1110S4.

On the other hand, in the present disclosure, at least one signal may be transmitted or received through the plurality of cone antennas 1110a to 1110d, 1150B, and 1110S1 to 1110S4 on a rear surface and/or a side surface of the electronic device 100. Meanwhile, the electronic device may communicate with the base station through any one of the plurality of antennas 1110a to 1110d, 1150B, and 1110S1 to 1110S4. Alternatively, the electronic device may perform multi-input multi-output (MIMO) communication with the base station through two or more antennas among the plurality of antennas 1110a to 1110d, 1150B, and 1110S1 to 1110S4.

Hereinafter, an electronic device having a cone antenna according to the present disclosure will be described.

Figure 4A:
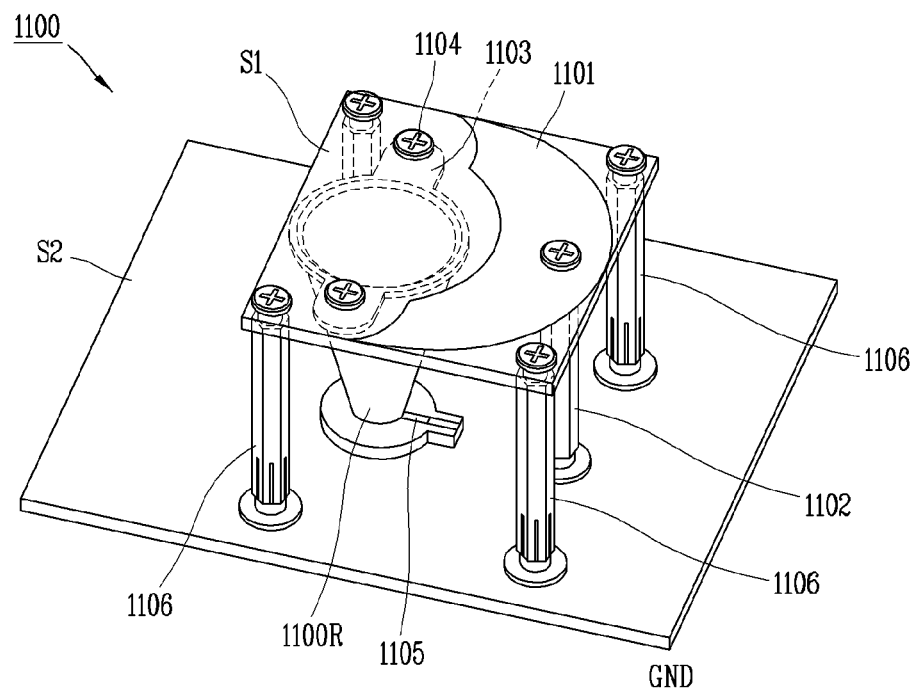
FIG. 4A is a perspective view showing a three-dimensional structure of a cone antenna according to the present disclosure. On the other hand.
Figure 4B:
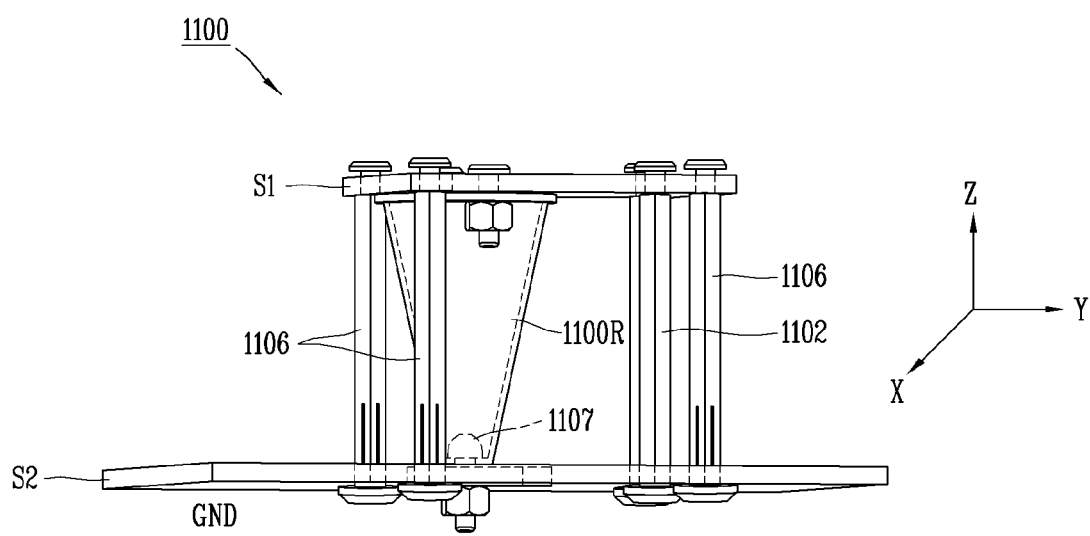
FIG. 4B is a side view showing a three-dimensional structure of the cone antenna according to the present disclosure.

In this regard, FIGS. 4A and 4B show a detailed structure of a broadband antenna (e.g., a cone antenna) capable of operating from a low frequency band to about 5 GHz band according to the present disclosure. Specifically, FIG. 4A shows a perspective view of a three-dimensional structure of a cone antenna according to the present disclosure. On the other hand, FIG. 4B shows a side view of a three-dimensional structure of the cone antenna according to the present disclosure.

Referring to FIGS. 4A and 4B, an electronic device having an antenna according to the present disclosure includes a cone antenna 1100.

Specifically, the cone antenna 1100 includes a first substrate S1 corresponding to an upper substrate, a second substrate S2 corresponding to a lower substrate, and a cone radiator 1100R. Furthermore, the cone antenna 1100 may further include a metal patch 1101, a shorting pin 1102, and a power feeder 1105.

In addition, the cone antenna 1100 may further include an outer rim 1103 and fasteners 1104 for allowing the cone antenna 1100 to be fixed to the first substrate S1 through the outer rim 1103. Furthermore, the cone antenna 1100 may further include a fastener 1107 that fastens non-metal supporters 1106 to the power feeder 1105. Here, the fasteners 1104 and 1107 may be implemented as fasteners such as screws having a predetermined diameter.

In this regard, the second substrate S2 may be spaced apart from the first substrate S1 by a predetermined gap, and may be provided with a ground layer GND. Meanwhile, the cone radiator 1100R may be disposed to be provided between the first substrate S1 and the second substrate S2. Specifically, the cone radiator 1100R may be vertically connected between the first substrate S1 and the second substrate S2 to connect the first substrate S1 and the second substrate S2. In addition, an upper part of the cone radiator 1100R is connected to the first substrate S1, and a lower part thereof is connected to the second substrate S2, and the cone radiator may include an upper aperture on the upper part.

Meanwhile, the metal patch 1101 may be disposed on the first substrate S1 to be spaced apart from the upper aperture. Specifically, an inner side shape of the metal patch 1101 may be disposed in a circular shape to correspond to a shape of an outer line of the upper aperture. Through this, a signal radiated from the cone radiator 1100R may be coupled through an inner side of the metal patch 1101.

On the other hand, the metal patch 1101 may be disposed on only one side to surround a partial region of an upper opening of the cone antenna 1100. Accordingly, an overall size of the cone antenna 1100 including the metal patch 1101 may be minimized.

Meanwhile, the shorting pin 1102 is disposed to electrically connect the metal patch 1101 and the ground layer GND of the second substrate S2. On the other hand, the shorting pin 1102 may be implemented in a structure in which a fastener such as a screw having a predetermined diameter is inserted into a structure such as a dielectric.

In this regard, in order to arrange a plurality of cone antennas in an electronic device, the cone antennas need to be implemented with a small size. For this purpose, the cone antenna structure according to the present disclosure may be referred to as a "cone with a shorting pin" or a "cone with a shorting supporter".

In this regard, the number of shorting pins or shorting supporters may be one or two. Specifically, the number of shorting pins or shorting supports may not be limited thereto and may be changed according to applications. However, in the "cone with a shorting pin" or the "cone with a shorting supporter" according to the present disclosure, one or two shorting pins or shorting supporters may be implemented to reduce a size of the antenna.

Specifically, the shorting pin 1102 may be provided with a single shorting pin between the metal patch 1101 and the second substrate S2. By such a single shorting pin 1102, a null of a radiation pattern of the cone antenna may be prevented from being generated. The operation principle and technical characteristics thereof will be described in detail with reference to FIGS. 7A and 7B.

In this regard, in a typical cone antenna, a null of the radiation pattern may be generated from boresight in an elevation angle direction, thereby deteriorating reception performance. In order to solve this problem, in the present disclosure, the null of the radiation pattern may be removed from boresight in the elevation angle direction through a structure in which the cone antenna 1110 is connected to a single shorting pin 1102. Accordingly, the present disclosure has an advantage in that reception performance can be improved in almost all directions.

In this regard, referring to FIG. 4A, the cone antenna with a single shorting pin forms a current path of the power feeder 1105-the cone radiator 1100R-the metal patch 1101-the shorting pin 1102-the ground layer (GND). In this way, through an asymmetric current path of the power feeder 1105-the cone radiator 1100R-the metal patch 1101-the shorting pin 1102-the ground layer GND, a null of the radiation pattern may be prevented from being generated from boresight in the elevation angle direction.

Meanwhile, the power feeder 1105 is disposed on the second substrate S2 and configured to transmit a signal through a lower aperture. To this end, an end portion of the power feeder 1105 may be defined in a ring shape to correspond to a shape of the lower aperture.

On the other hand, a cone antenna according to the present disclosure may further include at least one non-metal supporter 1106 to mechanically fix the cone radiator 1100R to the first substrate S1 and the second substrate S2. To this end, the non-metal supporter 1106 is configured to vertically connect the first substrate S1 and the second substrate S2 to support the first substrate S1 and the second substrate S2. On the other hand, since the non-metal supporter 1106 is not a metal and is not electrically connected to the metal patch 1101, the electrical characteristics of the cone antenna 1100 are not affected. Accordingly, the non-metal supporter 1106 may be disposed on an upper left, an upper right, a lower left, and a lower right of the first and second substrates S1 and S2 to vertically connect and support the first and second substrates S1 and S2. However, the present disclosure is not limited thereto, and may be modified into various structures capable of supporting the first substrate S1 and the second substrate S2.

Meanwhile, the outer rim 1103 may be integrally formed with the cone radiator 1100R, and may be connected to the first substrate S1 through the fasteners 1104. Here, the outer rim 1103 may be implemented as two outer rims at opposing points of the cone radiator 1100R.

On the other hand, the fastener 1107 may be configured to be connected to the second substrate S2 through an inside of an end portion (i.e., a ring shape) of the power feeder 1105. Accordingly, the second substrate S2 on which the power feeder 1105 is disposed and the cone radiator 1100R may be fixed through the fastener 1107. Accordingly, the fastener 1107 performs a role of fixing the cone radiator 1100R to the second substrate S2 as well as a role of a power feeder that transmits a signal to the cone radiator 1100R.

Figure 5A:
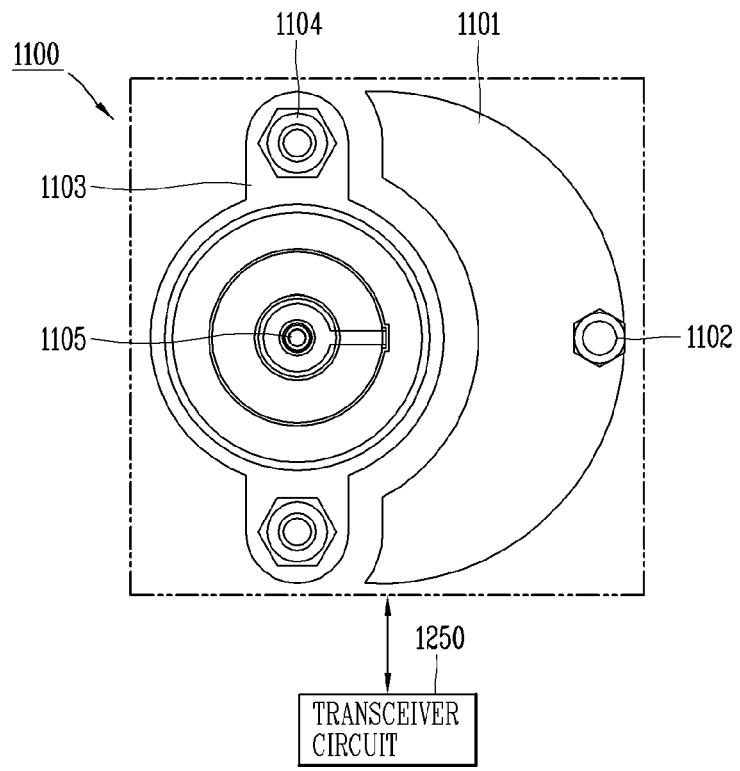
FIGS. 5A and 5B are front views showing a cone antenna having a structure of a cone with a single shorting pin according to the present disclosure.
Figure 5B:
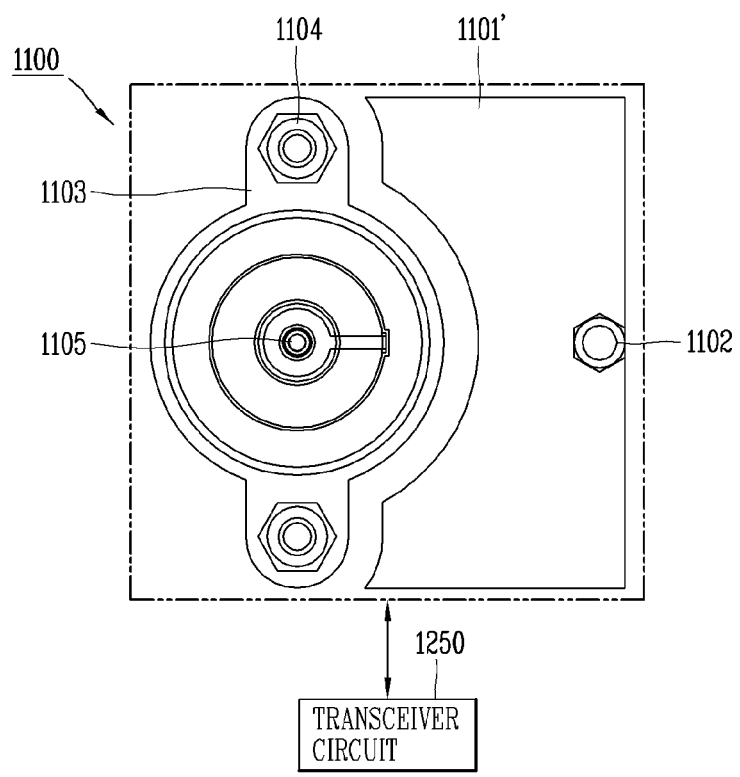

On the other hand, FIGS. 5A and 5B are front views showing a cone antenna having a structure of a cone with a single shorting pin according to the present disclosure. In this regard, the structure of a cone with a single shorting pin is a cone antenna implemented by a single shorting pin (or shorting supporter). Specifically, FIG. 5A shows a shape in which a metal patch having a circular shape is disposed on one side of an upper opening of the cone radiator. On the contrary, FIG. 5B shows a shape in which a rectangular metal patch is disposed on one side of the upper opening of the cone radiator.

Referring to FIGS. 5A and 5B, an electronic device according to the present disclosure includes the cone antenna 1100. Furthermore, the electronic device may further include a transceiver circuit 1250.

Meanwhile, referring to FIGS. 4A to 5B, the cone antenna 1100 is disposed between a first substrate, which is an upper substrate, and a second substrate, which is a lower substrate. On the other hand, the cone antenna 1100 may include metal patches 1101, 1101', 1101a, 1101b, and the shorting pin 1102. Here, the metal patch 1101 may be disposed in a surrounding region of one side of the upper aperture of the cone antenna 1100. In this regard, the metal patch 1101 may be disposed on the first substrate. Here, the cone antenna 1100 may refer to only a hollow cone antenna or refer to an entire antenna structure including the metal patch 1101.

Specifically, the metal patches 1101, 1101', 1101a, 1101b may be disposed in a surrounding region of the upper aperture of the cone antenna 1100, and disposed above the first substrate. Accordingly, the metal patch 1101 may be disposed at a position spaced apart from the upper aperture of the cone antenna 1100 in a z-axis by a thickness of the first substrate. As such, when the metal patch 1101 is disposed above the first substrate, there is an advantage in that a size of the cone antenna 1100 can be further reduced. Specifically, since the first substrate having a predetermined dielectric constant is disposed in an upper region of the cone antenna 1100 including the metal patch 1101, there is an advantage in that the size of the cone antenna 1100 can be further reduced.

Alternatively, the metal patches 1101, 1101', 1101a, 1101b may be disposed in a surrounding region of the upper aperture of the cone antenna 1100, and disposed below the first substrate. Accordingly, the metal patch 1101 may be spaced apart from the upper aperture of the cone antenna 1100 by a predetermined gap on the same plane on the z-axis. When the metal patch 1101 is disposed below the first substrate as described above, the first substrate may operate as a radome of the cone antenna 1100 including the metal patch 1101. Accordingly, there is an advantage in that the cone antenna 1100 including the metal patch 1101 can be protected from the outside and a gain of the cone antenna 1100 can be increased.

The shorting pin 1102 is configured to connect between the metal patch 1101, 1101', 1101a, 1101b and the ground layer GND disposed on the second substrate. As such, there is an advantage in that the size of the cone antenna 1100 can be reduced by the shorting pin 1102 configured to connect between the metal patch 1101 and the ground layer GND disposed on the second substrate. Meanwhile, the number of shorting pins 1102 may be one or two. A case where the number of shorting pins 1102 is one may be most advantageous in terms of reducing the size of the cone antenna 1100. Accordingly, the shorting pin 1102 may be defined as a single shorting pin between the metal patch and the second substrate, which is a lower substrate. However, the number of shorting pins may not be limited thereto, and two or more shorting pins may be used in terms of performance and structural stability of the cone antenna 1100. Depending on the application, some pins other than the shorting pin 1102 may be implemented as non-metal supporting pins in a non-metallic form.

The transceiver circuit 1250 may be connected to the cone radiator 1100R through the power feeder 1105, and may control a signal to be radiated through the cone antenna 1100. In this regard, the transceiver circuit 1250 may include a power amplifier 210 and a low-noise amplifier 310 at a front stage as shown in FIG. 2. Accordingly, the transceiver circuit 1250 may control the power amplifier 210 to radiate a signal amplified through the power amplifier 210 through the cone antenna 1100. Furthermore, the transceiver circuit 1250 may control the low noise amplifier 310 to amplify a signal received from the cone antenna 1100 through the low noise amplifier 310. In addition, the transceiver circuit 1250 may control elements inside the transceiver circuit 1250 to transmit and/or receive a signal through the cone antenna 1100.

In this regard, when the electronic device includes a plurality of cone antennas, the transceiver circuit 1250 may control a signal to be transmitted and/or received through at least one of the plurality of cone antennas. A case where the transceiver circuit 1250 transmits or receives a signal through only one cone antenna may be referred to as 1 Tx or 1 Rx, respectively. On the contrary, a case where the transceiver circuit 1250 transmits or receives a signal through two or more cone antennas may be referred to as n Tx or n Rx depending on the number of antennas.

For example, a case where the transceiver circuit 1250 transmits or receives a signal through two cone antennas may be referred to as 2 Tx or 2 Rx. However, a case where the transceiver circuit 1250 transmits or receives first and second signals having the same data through two cone antennas may be referred to as 1 Tx or 2 Rx. A case where the transceiver circuit 1250 transmits or receives the first and second signals having the same data through the two cone antennas as described above may be referred to as a diversity mode.

On the other hand, the metal patch 1101 may have a circular patch form as shown in FIG. 5A.

Furthermore, the metal patch 1101 may have a rectangular patch form as shown in FIG. 5B. In this regard, the metal patch 1101 may be implemented in a circular patch form or any polygonal patch form from the viewpoint of antenna downsizing and performance depending on the application. In this regard, any polygonal patch form may be approximated to a circular patch form as the order of the polygon increases.

Referring to FIG. 5A, the metal patch 1101 may be defined as a circular patch having an outer side shape in a circular form. Meanwhile, an inner side shape of the circular patch may be defined in a circular shape to correspond to a shape of an outer line of the upper aperture. Accordingly, a signal radiated from the cone antenna may be formed to be coupled through an inner side of the circular patch 1101, thereby having an advantage capable of optimizing the performance of the antenna.

Referring to FIG. 5B, the metal patch 1101' may be defined as a rectangular patch having an outer side shape in a rectangular form. On the other hand, an inner side shape of the rectangular patch may be defined in a circular shape to correspond to the shape of the outer line of the upper aperture. Accordingly, the signal radiated from the cone antenna may be formed to be coupled through an inner side of the rectangular patch 1101, thereby having an advantage of optimizing the performance of the antenna.

Meanwhile, a resonance length may be defined by an aperture of the metal patch 1101, 1101' having an aperture size larger than that of the upper aperture of the cone antenna. Accordingly, a signal radiated from the cone antenna 1100 may be coupled through an inner side of the metal patch 1101, 1101'. Accordingly, there is an advantage in that a size of the cone antenna 1100 can be reduced by the aperture of the metal patch 1101, 1101' having an aperture size larger than that of the upper aperture of the cone antenna.

In this regard, in the structure of a cone with a single shorting pin shown in FIGS. 5A and 5B, a length and a width, that is, L×W, of the cone antenna 1100, may be implemented as 0.13×0.14 l. Accordingly, the size can be reduced to about ¼ times that of 0.5 l, which is a size of a general patch antenna. On the other hand, the size can be reduced to about ½ times that of 0.25 l, which is a size of a patch antenna having a shorting pin. In this regard, since the length and width, that is, L×W, of the cone antenna 1100 including the metal patch 1101 is 0.13×0.14 l, a size of the upper aperture of the cone antenna 1100 can be implemented to be smaller than that.

Accordingly, in the cone antenna 1100 according to the present disclosure, the metal patch 1101 may be disposed in only a partial region to surround a partial region of the upper aperture of the cone antenna 1100. As a result, there is an advantage in that the size of the cone antenna 1100 including the metal patch 1101 can be minimized.

Furthermore, the height, length, and width, that is, H×L× W, of the cone antenna 1100 may be implemented as 0.06×0.13×0.14 l. Accordingly, the cone antenna 1100 according to the present disclosure including the metal patch 1101 and the shorting pin 1102 has an advantage in that the height can be reduced compared to a cone antenna in the related art. Accordingly, the cone antenna 1100 having the metal patch 1101 and the shorting pin 1102 according to the present disclosure has an advantage capable of reducing a height of the antenna on the z-axis as well as reducing a size of the antenna on an xy plane.

Figure 6A:
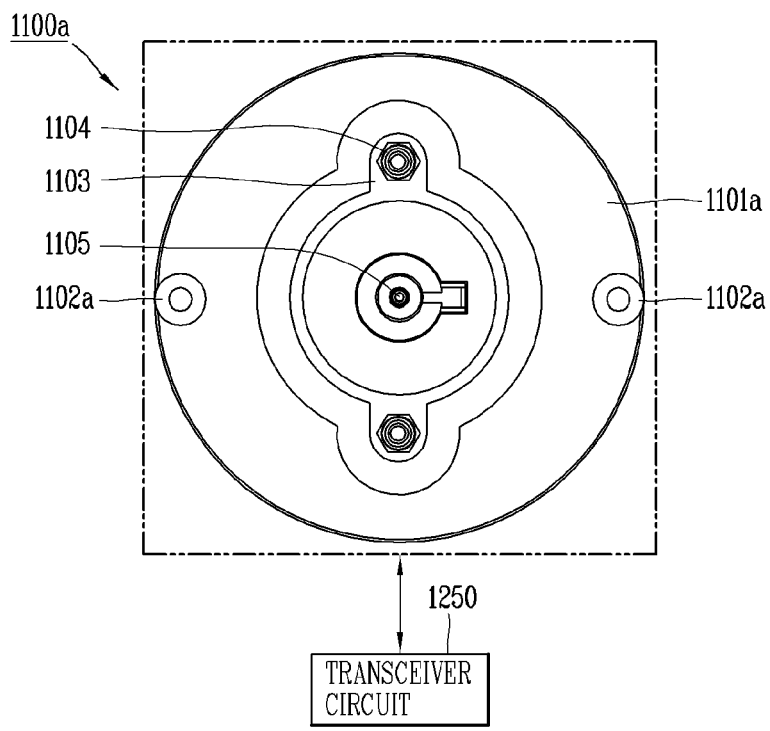
FIGS. 6A and 6B are views showing an electronic device provided with a cone antenna having a structure of a cone with two shorting pins according to an embodiment of the present disclosure.
Figure 6B:
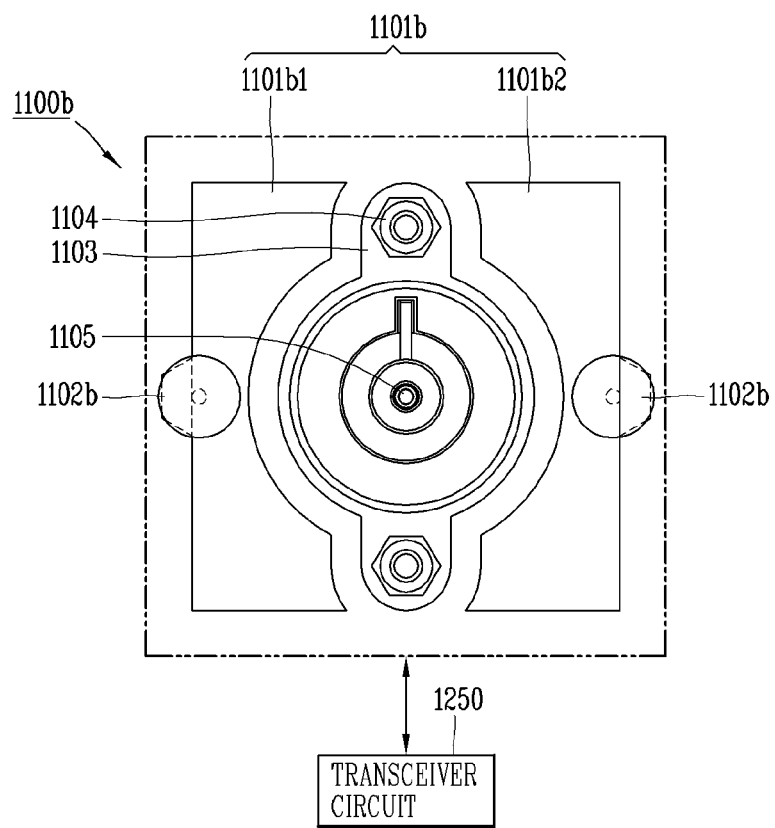

Meanwhile, FIGS. 6A and 6B show front views of a cone antenna including a circular patch and shorting pins according to another embodiment of the present disclosure. In FIG. 6A, the cone antenna 1100a may include a circular patch 1101a and two shorting pins 1102a. On the other hand, the cone antenna 1100a may connect the first substrate and the second substrate with two shorting pins 1102a and the remaining non-metal supporting pins.

In this regard, FIGS. 6A and 6B are views showing an electronic device provided with a cone antenna having a structure of a cone with two shorting pins according to an embodiment of the present disclosure. In this regard, the structure of a cone with two shorting pins is a cone antenna implemented by two shorting pins (or shorting supporters). Here, the structure of FIGS. 6A and 6B is not limited to the structure of a cone with two shorting pins, and may be a structure of a cone with a single shorting pin. In this regard, one of the two support structures may be implemented as a shorting pin and the other one as a non-metal supporter.

Specifically, one of the shorting pins 1102a of FIG. 6A may be replaced with the non-metal supporter 1106 of FIG. 4A. Accordingly, one of the non-metal supporters 1106 may be disposed in a metal patch disposed on the other side.

Referring to FIGS. 6A and 6B, the electronic device according to the present disclosure includes the cone antenna 1100a. Furthermore, the electronic device may further include the transceiver circuit 1250.

Meanwhile, referring to FIGS. 4A to 6B, the cone antenna 1100a is disposed between a first substrate, which is an upper substrate, and a second substrate, which is a lower substrate. Meanwhile, the cone antenna 1100a may include a metal patch 1101a and the shorting pin 1102a. Here, the metal patch 1101a may be disposed in a surrounding region of the upper aperture of the cone antenna 1100a. In this regard, the metal patch 1101 may be disposed on the first substrate.

On the other hand, the metal patch 1101a may be implemented as a circular patch to surround the entire upper aperture of the cone antenna 1100a. However, the present disclosure is not limited thereto, and the metal patch 1101a may be implemented as a circular patch that surrounds a part of the upper aperture of the cone antenna 1100a. Accordingly, the circular patch may be disposed at both sides of the upper aperture of the cone antenna 1100a or may be disposed at one side thereof.

Accordingly, in the cone antenna 1100a according to the present disclosure, the circular patch 1101a may be disposed in an entire region to surround an entire region of the upper aperture of the cone antenna 1100a. Specifically, a metal patch such as the circular patch 1101a may be disposed at both one side and the other side corresponding to the one side so as to surround the entire region of the upper opening of the cone antenna.

Accordingly, the cone antenna 1100a having the symmetrical circular patch 1101a and the shorting pins 1102a may have a slightly increased overall size compared to a case where the metal patch disposed only is provided at one side thereof. However, the cone antenna 1100a having the symmetrical circular patch 1101a and the shorting pin 1102a has an advantage in that the radiation pattern is symmetrical and can be implemented with broadband characteristics.

On the other hand, in the cone antenna 1100a according to the present disclosure, the circular patch 1101a may be disposed in only a partial region to surround a partial region of the upper aperture. Accordingly, there is an advantage in that the size of the cone antenna 1100a including the metal patch 1101a can be minimized.

Specifically, the metal patch 1101a may be disposed in a surrounding region of the upper aperture of the cone antenna 1100a, and disposed above the first substrate. Accordingly, the metal patch 1101a may be disposed at a position spaced apart from the upper aperture of the cone antenna 1100a in the z-axis by a thickness of the first substrate. As such, when the metal patch 1101a is disposed above the first substrate, there is an advantage in that a size of the cone antenna 1100a can be further reduced. Specifically, since the first substrate having a predetermined dielectric constant is disposed in an upper region of the cone antenna 1100 including the metal patch 1101a, there is an advantage in that the size of the cone antenna 1100 can be further reduced.

Alternatively, the metal patch 1101 may be formed in a peripheral area of the upper aperture of the cone antenna 1100a and disposed under the first substrate. Accordingly, the metal patch 1101a may be spaced apart from the upper aperture of the cone antenna 1100a by a predetermined gap on the same plane on the z-axis. When the metal patch 1101a is disposed below the first substrate as described above, the first substrate may operate as a radome of the cone antenna 1100a including the metal patch 1101a. Accordingly, there is an advantage in that the cone antenna 1100a including the metal patch 1101a can be protected from the outside and a gain of the cone antenna 1100a can be increased.

The shorting pin 1102a is configured to connect between the metal patch 1101a and the ground layer GND disposed on the second substrate. As such, there is an advantage in that the size of the cone antenna 1100a can be reduced by the shorting pin 1102a configured to connect between the metal patch 1101a and the ground layer GND disposed on the second substrate.

The transceiver circuit 1250 may be connected to the cone antenna 1100b to control a signal to be radiated through the cone antenna 1100b. The detailed description related thereto will be replaced with the description in FIGS. 5A and 5B.

Referring to FIG. 6A, the metal patch 1101a may be defined as a circular patch having an outer side shape in a circular form. Meanwhile, an inner side shape of the circular patch may be defined in a circular shape to correspond to a shape of an outer line of the upper aperture. Accordingly, a signal radiated from the cone antenna may be formed to be coupled through an inner side of the circular patch 1101a, thereby having an advantage capable of optimizing the performance of the antenna.

Meanwhile, a resonance length may be defined by an aperture of the metal patch 1101a having an aperture size larger than that of the upper aperture of the cone antenna. Accordingly, a signal radiated from the cone antenna 1100a may be coupled through an inner side of the circular patch 1101a. Accordingly, there is an advantage in that a size of the cone antenna 1100a can be reduced by the aperture of the circular patch 1101a having an aperture size larger than that of the upper aperture of the cone antenna.

In this regard, in the structure of a cone with two shorting pins on the circular patch shown in FIG. 6A, a length and a width, that is, L×W, of the cone antenna 1100a, may be implemented as 0.22×0.22 l. Accordingly, the size can be reduced to about ½ times that of 0.5 l, which is a size of a general patch antenna. On the other hand, the antenna can be implemented with a size smaller than 0.25 l, which is a size of a patch antenna having a shorting pin. In this regard, since the length and width, that is, L×W, of the cone antenna 1100a including the circular patch 1101a is 0.22×0.22 l, a size of the upper aperture of the cone antenna 1100a can be implemented to be smaller than that.

Furthermore, the height, length, and width, that is, H×L×W, of the cone antenna 1100a may be implemented as 0.07×0.22×0.22 l. Accordingly, the cone antenna 1100a according to the present disclosure including the circular patch 1101a and the shorting pin 1102a has an advantage in that the height can be reduced compared to a cone antenna in the related art. Accordingly, the cone antenna 1100a having the circular patch 1101a and the shorting pin 1102a according to the present disclosure has an advantage capable of reducing a height of the antenna on the z-axis as well as reducing a size of the antenna on an xy plane.

On the other hand, FIG. 6B is a view showing an electronic device provided with a cone antenna having a structure of a cone with two shorting pins according to another embodiment of the present disclosure. In this regard, the structure of a cone with two shorting pins is a cone antenna implemented by two shorting pins (or shorting supporters). Here, the structure of FIGS. 6A and 6B is not limited to the structure of a cone with two shorting pins, and may be a structure of a cone with a single shorting pin. In this regard, one of the two support structures may be implemented as a shorting pin and the other one as a non-metal supporter. Specifically, one of the shorting pins 1102b of FIG. 6B may be replaced with the non-metal supporter 1106 of FIG. 4A. Accordingly, one of the non-metal supporters 1106 may be disposed in a metal patch 1101b1 on the other side.

Referring to FIG. 6B, the electronic device according to the present disclosure includes the cone antenna 1100b. Furthermore, the electronic device may further include the transceiver circuit 1250.

Meanwhile, referring to FIGS. 4 to 6B, the cone antenna 1100b is disposed between a first substrate, which is an upper substrate, and a second substrate, which is a lower substrate. Meanwhile, the cone antenna 1100a may include a metal patch 1101b and the shorting pins 1102b. Here, the metal patch 1101b may be disposed in a surrounding region of the upper aperture of the cone antenna 1100b. In this regard, the metal patch 1101 may be disposed on the first substrate.

On the other hand, the metal patch 1101b may be implemented as a rectangular patch to surround the entire upper aperture of the cone antenna 1100b. However, the present disclosure is not limited thereto, and the metal patch 1101b may be implemented as a rectangular patch that surrounds a part of the upper aperture of the cone antenna 1100b. Accordingly, the rectangular patch may be disposed at both sides of the upper aperture of the cone antenna 1100b or may be disposed at one side thereof.

Accordingly, in the cone antenna 1100b according to the present disclosure, the rectangular patch 1101b may be substantially disposed in an entire region to surround a region of the upper aperture of the cone antenna 1100a. In this regard, in order to reduce a size of the rectangular patch 1101b, the rectangular patch 1101b may not be disposed in a region around the fasteners 1104 supporting the cone antenna 1100b. Accordingly, the rectangular patches 1101b may be respectively disposed in left and right regions of the cone antenna 1100b.

In this regard, the metal patch 1101b may include a first metal patch 1101b1 and a second metal patch 1101b2. Specifically, the first metal patch 1101b1 may be disposed at a left side of the upper aperture of the cone antenna 1100b to surround the upper aperture. In addition, the second metal patch 1101b2 may be disposed at a right side of the upper aperture of the cone antenna 1100b to surround the upper aperture.

Accordingly, the first metal patch 1101b and the second metal patch 1101b2 are disposed to allow metal patterns thereof to be separated from each other, thereby reducing an overall size of the antenna. In this regard, when the first metal patch 1101b and the second metal patch 1101b2 are connected to each other, the metal patch 1101b may partially operate as a radiator. Accordingly, the bandwidth may be partially limited by an unwanted resonance due to the effect of the metal patch 1101b having a narrower bandwidth than the cone antenna 1100b.

In order to prevent such bandwidth limitation, the first metal patch 1101b and the second metal patch 1101b2 may be disposed to allow the metal patterns to be separated from each other. Accordingly, the cone antenna 1100b in which the metal patterns are separated from each other by the first metal patch 1101b and the second metal patch 1101b2 may operate as a broadband antenna. Accordingly, the first metal patch 1101b and the second metal patch 1101b2 may not be disposed in a region corresponding to the outer rim 1103 constituting the upper aperture.

Accordingly, the cone antenna 1100b having the symmetrical rectangular patches 1101b and the shorting pins 1102b disposed in left and right regions, respectively, has a slightly increased width compared to a case where the metal patch is disposed only at one side thereof. In this regard, a width W of an asymmetrical rectangular patch structure in FIG. 5 is 0.13 l, whereas a width W of the symmetrical rectangular patch structure in FIG. 6B is 0.14 l. In other words, an increase in the width W of the symmetrical rectangular patch structure is not substantially large. On the other hand, the cone antenna 1100b having the symmetrical rectangular patch 1101b and the shorting pins 1102b has an advantage in that the radiation pattern is symmetrical and can be implemented with broadband characteristics.

Specifically, the rectangular patch 1101b may be disposed in a surrounding region of the upper aperture of the cone antenna 1100b, and disposed above the first substrate. Accordingly, the metal patch 1101b may be disposed at a position spaced apart from the upper aperture of the cone antenna 1100b in the z-axis by a thickness of the first substrate. As such, when the metal patch 1101b is disposed above the first substrate, there is an advantage in that a size of the cone antenna 1100b can be further reduced. Specifically, since the first substrate having a predetermined dielectric constant is disposed in an upper region of the cone antenna 1100 including the metal patch 1101b, there is an advantage in that the size of the cone antenna 1100b can be further reduced.

Alternatively, the rectangular patch 1101b may be disposed in a surrounding region of the upper aperture of the cone antenna 1100b, and disposed below the first substrate. Accordingly, the metal patch 1101b may be spaced apart from the upper aperture of the cone antenna 1100b by a predetermined gap on the same plane on the z-axis. When the metal patch 1101b is disposed below the first substrate as described above, the first substrate may operate as a radome of the cone antenna 1100b including the metal patch 1101b. Accordingly, there is an advantage in that the cone antenna 1100b including the metal patch 1101b can be protected from the outside and a gain of the cone antenna 1100b can be increased.

The shorting pins 1102b are configured to connect between the metal patch 1101a and the ground layer GND disposed on the second substrate. As such, there is an advantage in that the size of the cone antenna 1100a can be reduced by the shorting pin 1102a configured to connect between the metal patch 1101a and the ground layer GND disposed on the second substrate.

The transceiver circuit 1250 may be connected to the cone antenna 1100b to control a signal to be radiated through the cone antenna 1100b. The detailed description related thereto will be replaced with the description in FIG. 5.

Referring to FIG. 6B, the rectangular patch 1101b may be defined as a rectangular patch having an outer side shape in a rectangular form. Meanwhile, an inner side shape of the rectangular patch may be defined in a circular shape to correspond to a shape of an outer line of the upper aperture. Accordingly, the signal radiated from the cone antenna may be formed to be coupled through an inner side of the rectangular patch 1100b, thereby having an advantage capable of optimizing the performance of the antenna.

Meanwhile, a resonance length may be defined by a circular aperture of the rectangular patch 1101b having an aperture size larger than that of the upper aperture of the cone antenna. Accordingly, a signal radiated from the cone antenna 1100b may be coupled through an inner side of the rectangular patch 1101b. Accordingly, there is an advantage in that a size of the cone antenna 1100*b* can be reduced by the aperture of the rectangular patch 1101*b* having an aperture size larger than that of the upper aperture of the cone antenna.

In this regard, in the structure of a cone with two shorting pins on two rectangular patches shown in FIG. 6B, a length and a width, that is, L×W, of the cone antenna 1100*b*, may be implemented as 0.14×0.14 l. Accordingly, the size can be reduced to about ¼ times that of 0.5 l, which is a size of a general patch antenna. On the other hand, the size can be reduced to about ½ times that of 0.25 l, which is a size of a patch antenna having a shorting pin. In this regard, since the length and width, that is, L×W, of the cone antenna 1100*b* including the circular patch 1101*b* is 0.14×0.14 l, a size of the upper aperture of the cone antenna 1100*b* can be implemented to be smaller than that.

Furthermore, the height, length, and width, that is, H×L×W, of the cone antenna 1100*b* may be implemented as 0.07×0.14×0.14 l. Accordingly, the cone antenna 1100*b* according to the present disclosure including the rectangular patch 1101*b* and the shorting pins 1102*b* has an advantage in that the height can be reduced compared to a cone antenna in the related art. Accordingly, the cone antenna 1100*b* having the rectangular patch 1102*b* and the shorting pins 1102*b* according to the present disclosure has an advantage capable of reducing a height of the antenna on the z-axis as well as reducing a size of the antenna on an xy plane.

Meanwhile, the cone antenna 1100, 1100*a*, 1100*b* according to FIGS. 5A to 6B may be defined in a tapered conical form such that an upper diameter thereof is greater than a lower diameter thereof. In addition, the cone antenna 1100, 1100*a*, 1100*b* according to FIGS. 5A to 6B may be defined in a hollow conical shape to reduce a weight of the electronic device provided with the cone antenna 1100, 1100*a*, 1100*b*.

On the other hand, the cone antenna 1100, 1100*a*, 1100*b* according to FIGS. 5A to 6B may include the outer rim 1103 and the fasteners 1104. In this regard, the outer rim 1103 may define an upper aperture of the cone antenna 1100, 1100*a*, 1100*b*. In addition, the outer rim 1103 may be configured to connect the first substrate, which is an upper substrate, and the cone antennas 1100, 1100*a*, 1100*b*. On the other hand, the fasteners 1104 are configured to connect the outer rim 1103 and the first substrate, which is an upper substrate. Specifically, the cone antenna 1100, 1100*a*, 1100*b* may be mechanically fastened to the first substrate through two fasteners 1104 on opposing regions of the outer rim 1103.

On the other hand, the shorting pin 1102, 1102*a*, 1102*b* according to FIGS. 5A to 6B may be disposed in a central portion of the other side corresponding to a boundary of the metal patch 1101, 1101*a*, 1101*b*. Accordingly, a size of the cone antenna 1100, 1100*a*, 1100*b* including the metal patch 1101, 1101*a*, 1101*b* may be minimized.

Meanwhile, when the metal patch 1101' according to FIG. 5A is disposed to surround a partial region of the upper aperture of the cone antenna 1100, the number of shorting pins 1102 may be implemented as one. Accordingly, there is an advantage in that an entire size of the antenna can be reduced by the single shorting pin 1102 and the metal patch 1101 disposed only at one side of the cone antenna 1100.

On the other hand, when the metal patch 1101*a*, 1101*b* according to FIGS. 6A and 6B is disposed to surround substantially the entire region with respect to the upper aperture of the cone antenna 1100*a*, 1100*b*, the number of shorting pins 1102*a*, 1102*b* may be implemented as two. When the metal patch 1101*a*, 1101*b* is disposed to substantially surround an entire region of the upper aperture, it is advantageous to increase the number of shorting pins 1102*a*, 1102*b* in terms of overall characteristics improvement and structural stability of the antenna.

Figure 7A:
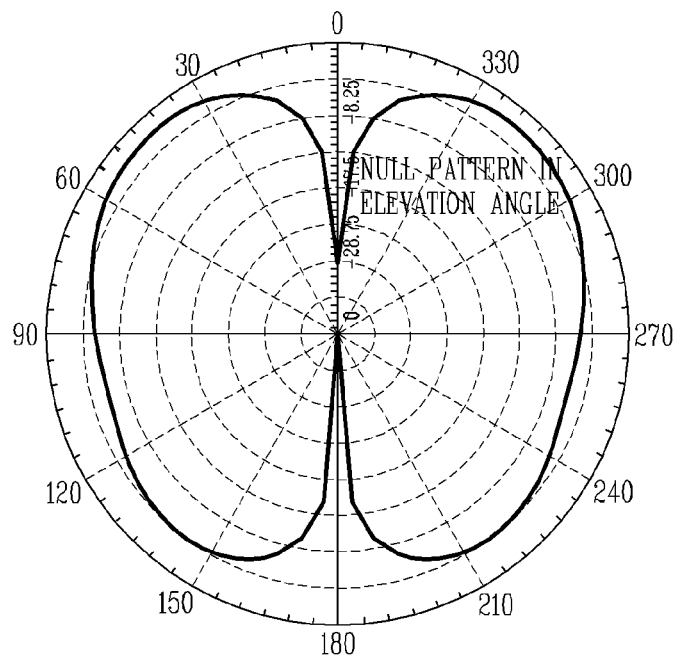
FIG. 7A shows a radiation pattern for a symmetrical structure such as a cone antenna provided with two shorting pins. On the other hand.
Figure 7A:
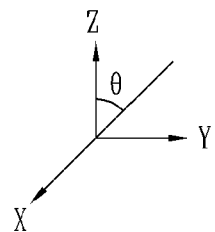

On the other hand, the electronic device having the cone antenna according to the present disclosure has excellent reception performance in almost all directions through the cone antenna. Specifically, a radiation pattern of the cone antenna has excellent reception performance even from boresight in the elevation angle direction. In this regard, FIG. 7A shows a radiation pattern for a symmetrical structure such as a cone antenna provided with two shorting pins. On the other hand, FIG. 7B shows a radiation pattern for a structure such as a cone antenna provided with a single shorting pin.

Referring to FIG. 7A, a cone antenna having two shorting pins has a problem in that a null of the radiation pattern is generated from boresight in an elevation angle direction, thereby deteriorating reception performance. In order to solve this problem, in the present disclosure, the null of the radiation pattern may be removed from boresight in the elevation angle direction through a structure in which the cone antenna 1110 is connected to a single shorting pin 1102. In this regard, referring to FIG. 4A, the cone antenna with a single shorting pin forms a current path of the power feeder 1105-the cone radiator 1100R-the metal patch 1101-the shorting pin 1102-the ground layer (GND). In this way, through an asymmetric current path of the power feeder 1105-the cone radiator 1100R-the metal patch 1101-the shorting pin 1102-the ground layer GND, a null of the radiation pattern may be prevented from being generated from boresight in the elevation angle direction.

Figure 7B:
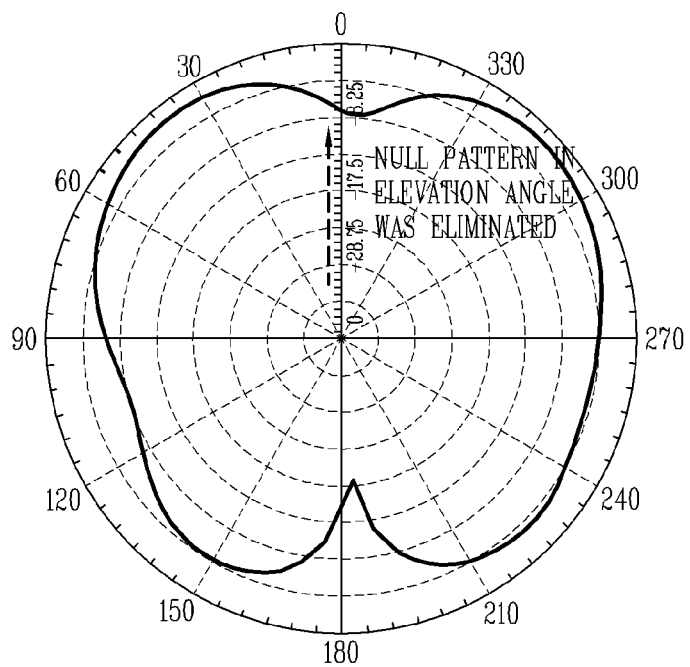
FIG. 7B shows a radiation pattern for a structure such as a cone antenna provided with a single shorting pin.
Figure 7B:
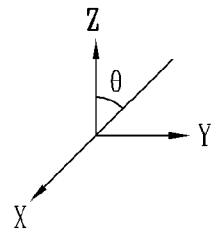

Referring to FIG. 7B, in the cone antenna having a single shorting pin, the null of the radiation pattern may be removed from boresight in the elevation angle direction. Accordingly, the present disclosure has an advantage in that reception performance can be improved in almost all directions.

In the above, the electronic device including the cone antenna 1100, 1100*a*, 1100*b* having the metal patch 1101, 1101*a*, 1101*b* and the shorting pin 1102, 1102*a*, 1102*b* according to an aspect of the present disclosure has been described. Hereinafter, an electronic device including the cone antenna 1100, 1100*a*, 1100*b* having the metal patch 1101, 1101*a*, 1101*b* and the power feeder 1105 according to another aspect of the present disclosure will be described. Here, the power feeder 1105 is disposed on the second substrate, which is a lower substrate, and is configured to transmit a signal through a lower part of the cone antenna 1100, 1100*a*, 1100*b*. Meanwhile, the electronic device according to the present disclosure may further include the transceiver circuit 1250.

On the other hand, referring to FIGS. 4A to 6B, the cone antenna 1100, 1100*a*, 1100*b* is disposed between a first substrate, which is an upper substrate, and a second substrate, which is a lower substrate. Meanwhile, the cone antenna 1100, 1100*a*, 1100*b* may include the metal patch 1101, 1101*a*, 1101*b*, the shorting pin 1102, 1102*a*, 1102*b*, and the power feeder 1105. Here, the metal patch 1101, 1101*a*, 1101*b* may be disposed in a surrounding region of one side of the upper aperture of the cone antenna 1100, 1100*a*, 1100*b*. In this regard, the metal patch 1101 may be disposed on the first substrate.

Specifically, the metal patch 1101, 1101*a*, 1101*b* may be disposed in a surrounding region of the upper aperture of the cone antenna 1100, 1100*a*, 1100*b*, and disposed above the first substrate. Accordingly, the metal patch 1101, 1101*a*, 1101*b* may be disposed at a position spaced apart from the upper aperture of the cone antenna 1100, 1100a, 1100b in the z-axis by a thickness of the first substrate. As such, when the metal patch 1101, 1101a, 1101b is disposed above the first substrate, there is an advantage in that a size of the cone antenna 1100, 1100a, 1100b can be further reduced. Specifically, since the first substrate having a predetermined dielectric constant is disposed in an upper region of the cone antenna 1100, 1100a, 1100b including the metal patch 1101, 1101a, 1101b, there is an advantage in that the size of the cone antenna 1100, 1100a, 1100b can be further reduced.

Alternatively, the metal patch 1101, 1101a, 1101b may be disposed in a surrounding region of the upper aperture of the cone antenna 1100, 1100a, 1100b, and disposed below the first substrate. Accordingly, the metal patch 1101, 1101a, 1101b may be spaced apart from the upper aperture of the cone antenna 1100, 1100a, 1100b by a predetermined gap on the same plane on the z-axis. As such, when the metal patch 1101, 1101a, 1101b is disposed below the first substrate, the first substrate may operate as a radome of the cone antenna 1100, 1100a, 1100b. Accordingly, the cone antenna 1100, 1100a, 1100b including the metal patch 1101, 1101a, 1101b may be protected from the outside. Furthermore, there is an advantage in that a gain of the cone antenna 1100, 1100a, 1100b can be increased.

The shorting pin 1102, 1102a, 1102b is configured to connect between the metal patch 1101, 1101a, 1101b and the ground layer GND disposed on the second substrate. As described above, an overall size of the antenna can be reduced by the shorting pin 1102, 1102a, 1102b configured to connect between the metal patch 1101, 1101a, 1101b and the ground layer GND disposed on the second substrate. Meanwhile, the number of shorting pins 1102, 1102a, 1102b may be one or two.

The transceiver circuit 1250 may be connected to the cone antenna 1100 to control a signal to be radiated through the cone antenna 1100, 1100a, 1100b. In this regard, when the electronic device includes a plurality of cone antennas, the transceiver circuit 1250 may control a signal to be transmitted and/or received through at least one of the plurality of cone antennas. A case where the transceiver circuit 1250 transmits or receives a signal through only one cone antenna may be referred to as 1 Tx or 1 Rx, respectively. On the contrary, a case where the transceiver circuit 1250 transmits or receives a signal through two or more cone antennas may be referred to as n Tx or n Rx depending on the number of antennas.

For example, a case where the transceiver circuit 1250 transmits or receives a signal through two cone antennas may be referred to as 2 Tx or 2 Rx. However, a case where the transceiver circuit 1250 transmits or receives first and second signals having the same data through two cone antennas may be referred to as 1 Tx or 2 Rx. A case where the transceiver circuit 1250 transmits or receives the first and second signals having the same data through the two cone antennas as described above may be referred to as a diversity mode.

Meanwhile, the metal patch 1101, 1101b may have a rectangular patch form. In this regard, the metal patch 1101a may be implemented in a circular patch form or any polygonal patch form from the viewpoint of antenna downsizing and performance depending on the application. In this regard, any polygonal patch form may be approximated to a circular patch form as the order of the polygon increases.

Figure 8:
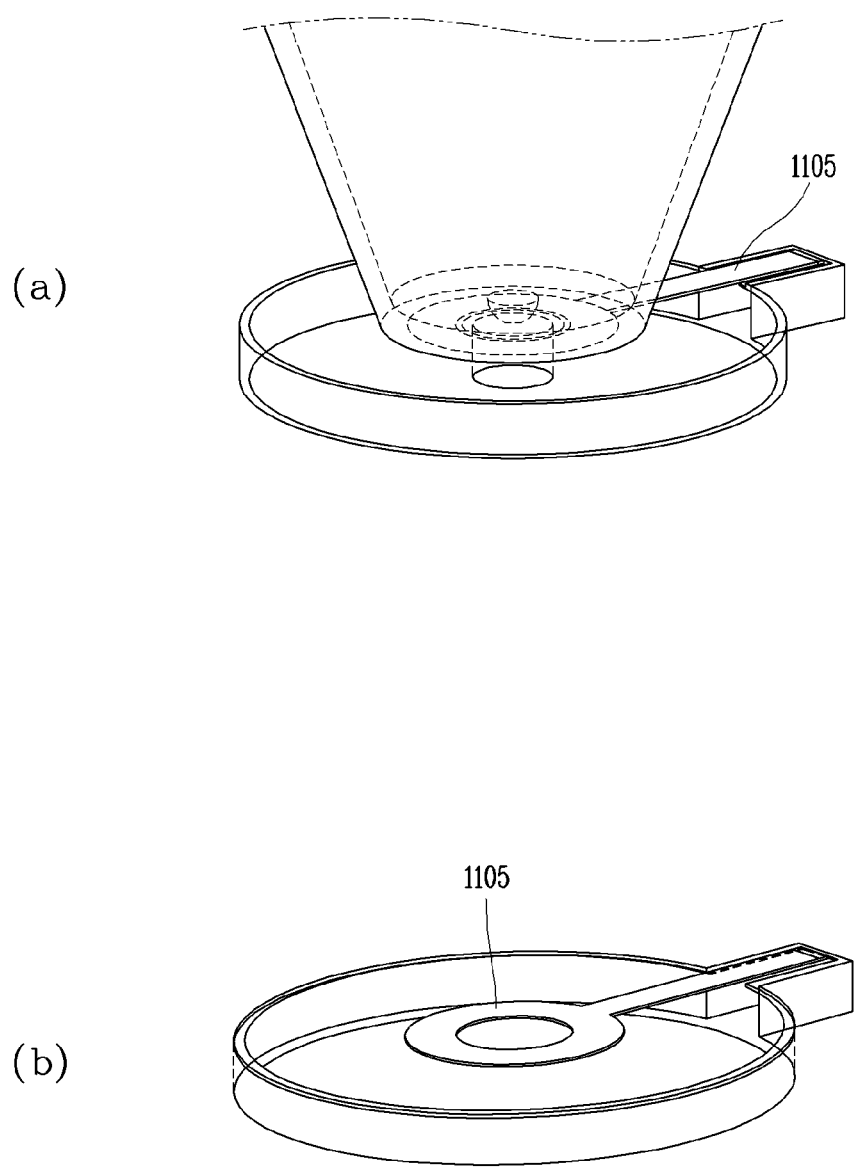
FIG. 8 shows a fastening structure between a power feeder that feeds power to the cone antenna according to the present disclosure and the cone antenna, and the power feeder corresponding to a shape of the cone antenna that feeds power to the cone antenna.

Meanwhile, the power feeder 1105 may be disposed in a form corresponding to a shape of the cone antenna 1100, 1100a, 1100b on the second substrate, which is a lower substrate. In this regard, FIG. 8 shows a fastening structure between a power feeder that feeds power to the cone antenna according to the present disclosure and the cone antenna, and the power feeder corresponding to a shape of the cone antenna that feeds power to the cone antenna.

Referring to FIGS. 5A to 6B and 8, the power feeder 1105 may have a form corresponding to a shape of the cone antenna 1000, 1100a, 1100b on the second substrate, which is a lower substrate, that is, a form in which an end portion of the power feeder 1105 has a ring shape.

Accordingly, the power feeder 1105 may transmit a signal through a lower part of the cone antenna 1100, 1100a, 1100b to radiate a signal through the upper aperture of the cone antenna 1100, 1100a, 1100b and the metal patch 1101, 1101a, 1101b.

Figure 9A:
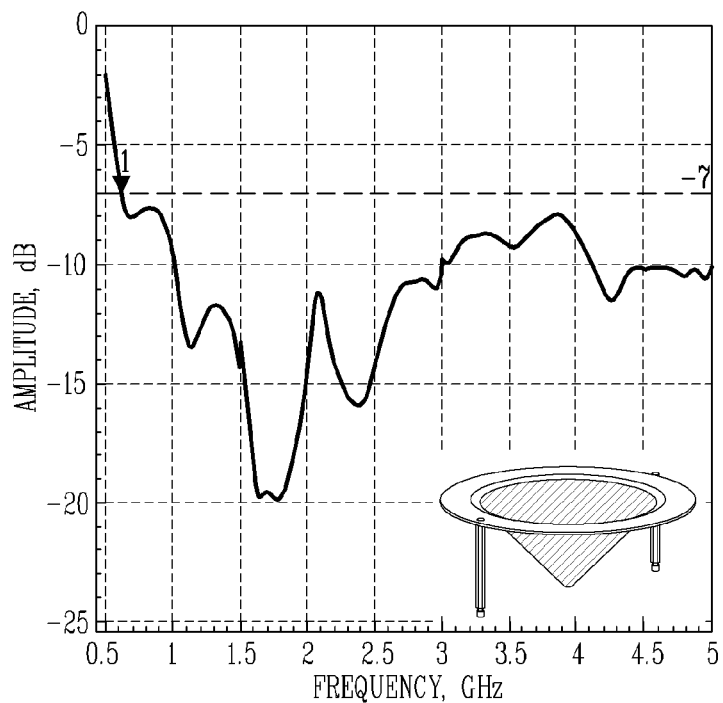
FIGS. 9A and 9B show reflection coefficient characteristics of a cone antenna having a circular patch and shorting pins according to an embodiment of the present disclosure.
Figure 9B:
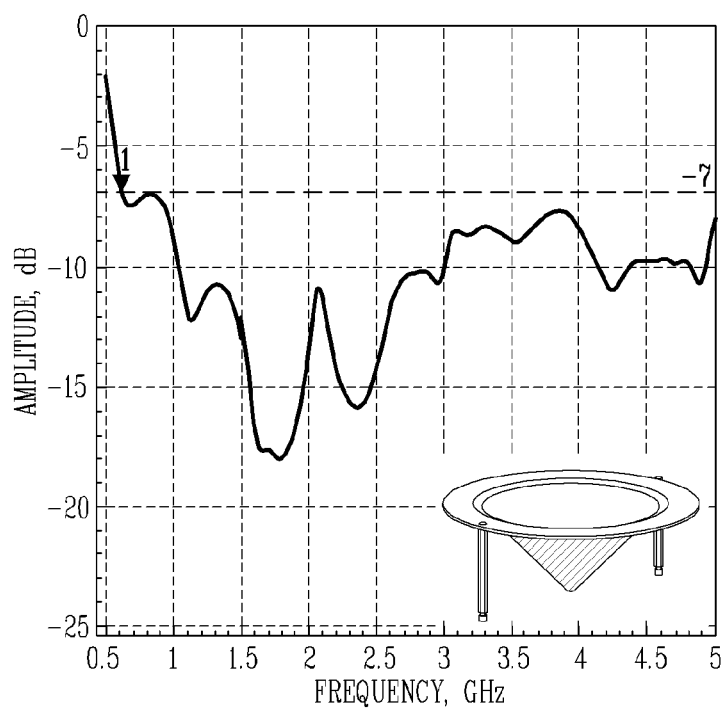

On the other hand, FIGS. 9A and 9B show reflection coefficient characteristics of a cone antenna having a circular patch and shorting pins according to an embodiment of the present disclosure. Specifically, FIG. 9A shows reflection coefficient characteristics of a solid cone antenna having a circular patch and shorting pins. On the contrary, FIG. 9B shows reflection coefficient characteristics of a hollow cone antenna having a circular patch and shorting pins. Here, the cone antenna having the circular patch and the shorting pins in FIG. 9B corresponds to the cone antenna 1100a having the circular patch 1101a and the shorting pins 1102a in FIG. 6. Here, the number of the shorting pins 1102a is two.

Referring to FIGS. 9A and 9B, the reflection coefficients of the solid cone antenna and the hollow cone antenna have good characteristics of −7 dB or less in a broadband from 0.6 GHz to 5 GHz. Furthermore, the reflection coefficients of the solid cone antenna and the hollow cone antenna have very similar characteristics in the broadband from 0.6 GHz to 5 GHz. Accordingly, in the present disclosure, in order to reduce the weight of an electronic device having at least one cone antenna, the hollow cone antenna may be adopted.

More specifically, the operating frequencies of the solid cone antenna and the hollow cone antenna in FIGS. 9A and 9B start from 617 MHz. As an example, in FIGS. 9A and 9B, the dimensions of the solid cone antenna and the hollow cone antenna are shown in Table 1 below.

TABLE 1

Cone height: 34 mm (0.07λ) Antenna height: 35 mm (0.07λ)
Cone size: 70 mm (0.14λ) Antenna size: 100 × 100 mm (0.21λ × 0.21λ)
Volume of cone antenna with two shorting pins on circular patch
(H × L × W): 0.07λ × 0.21λ × 0.21λ

Figure 10A:
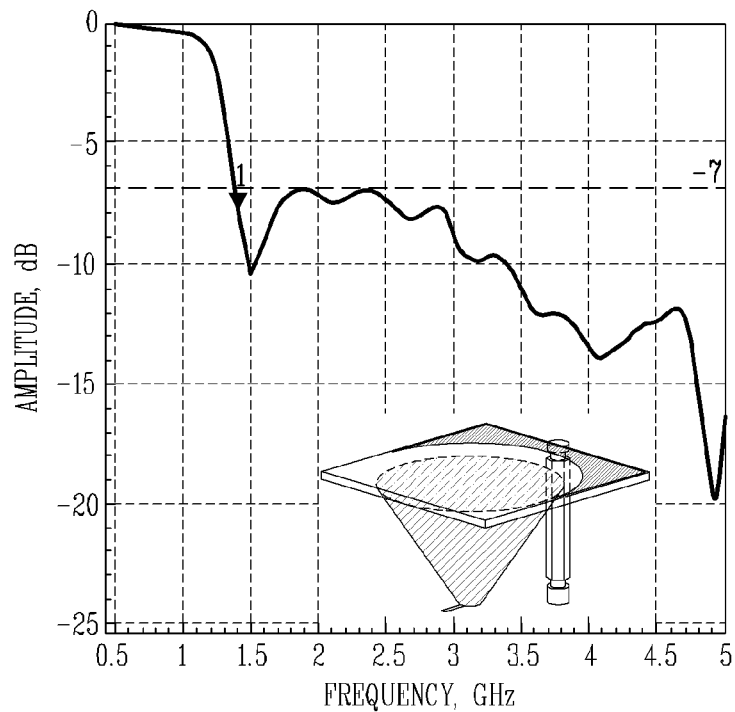
FIGS. 10A and 10B show reflection coefficient characteristics of a cone antenna having a rectangular patch and a shorting pin according to an embodiment of the present disclosure.
Figure 10B:
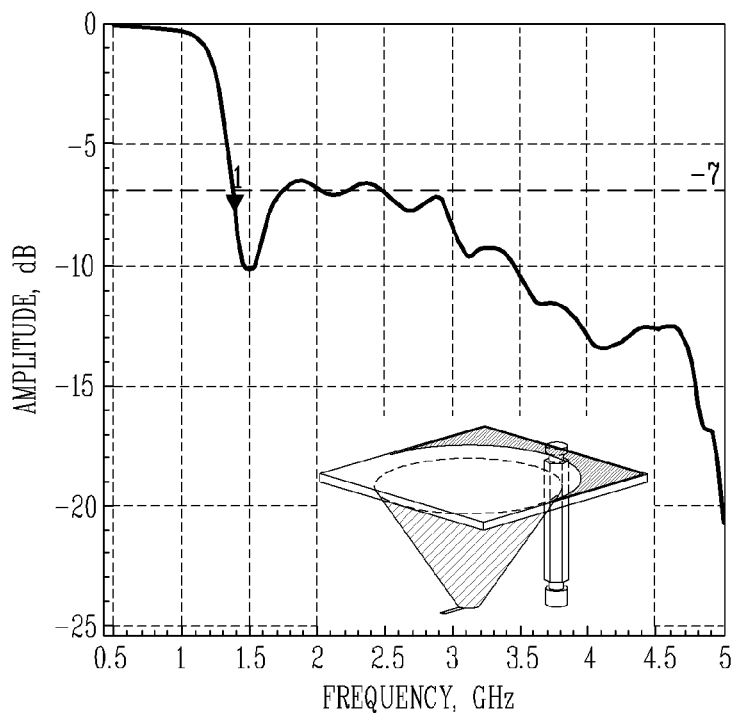

On the other hand, FIGS. 10A and 10B show reflection coefficient characteristics of a cone antenna having a rectangular patch and a shorting pin according to an embodiment of the present disclosure. Specifically, FIG. 10A shows reflection coefficient characteristics of a solid cone antenna having a rectangular patch and a shorting pin. On the contrary, FIG. 10B shows reflection coefficient characteristics of a hollow cone antenna having a rectangular patch and a shorting pin. Here, the cone antenna having the rectangular patch and the shorting pin in FIG. 10B corresponds to the cone antenna 1100 having the rectangular patch 1101 and the shorting pins 1102 in FIG. 6. Here, the number of the shorting pins 1102a is one. Referring to FIGS. 9A and 9B, the reflection coefficients of the solid cone antenna and the hollow cone antenna have good characteristics of −7 dB or less in a broadband from 1.4 GHz to 5 GHz. Furthermore, the reflection coefficients of the solid cone antenna and the hollow cone antenna have similar characteristics in the broadband from 1.4 GHz to 5 GHz. More specifically, in a high frequency band around 5 GHz, the reflection coefficient characteristic of the hollow cone antenna is superior to that of the solid cone antenna. Accordingly, in the present disclosure, the hollow cone antenna may be adopted to improve reflection coefficient characteristics in a high frequency band as well as to reduce a weight of the electronic device having at least one cone antenna.

More specifically, the operating frequencies of the solid cone antenna and the hollow cone antenna in FIGS. 10A and 10B start from 1.4 GHz. As an example, in FIGS. 10A and 10B, the dimensions of the solid cone antenna and the hollow cone antenna are shown in Table 1 below.

TABLE 2

Cone height: 15 mm (0.07λ) Antenna height: 16 mm (0.07λ)
Cone size: 26 mm (0.12λ) Antenna size: 32 × 32 mm (0.15λ × 0.15λ)
Volume of cone antenna with single shorting pin on rectangular patch
(H × L × W): 0.07λ × 0.15λ × 0.15λ

Figure 11A:
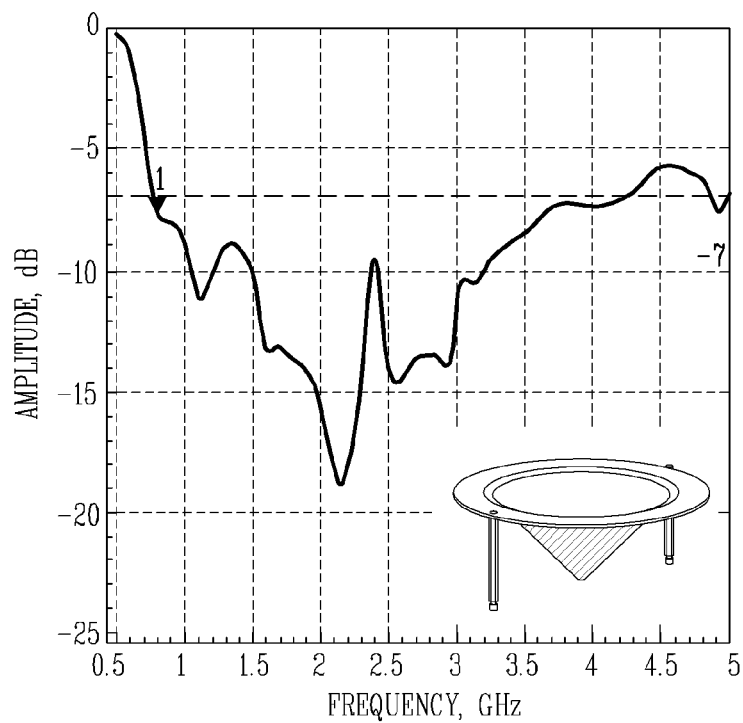
FIGS. 11A and 11B show reflection coefficient characteristics of a cone antenna having a circular patch and shorting pins according to another embodiment of the present disclosure.
Figure 11B:
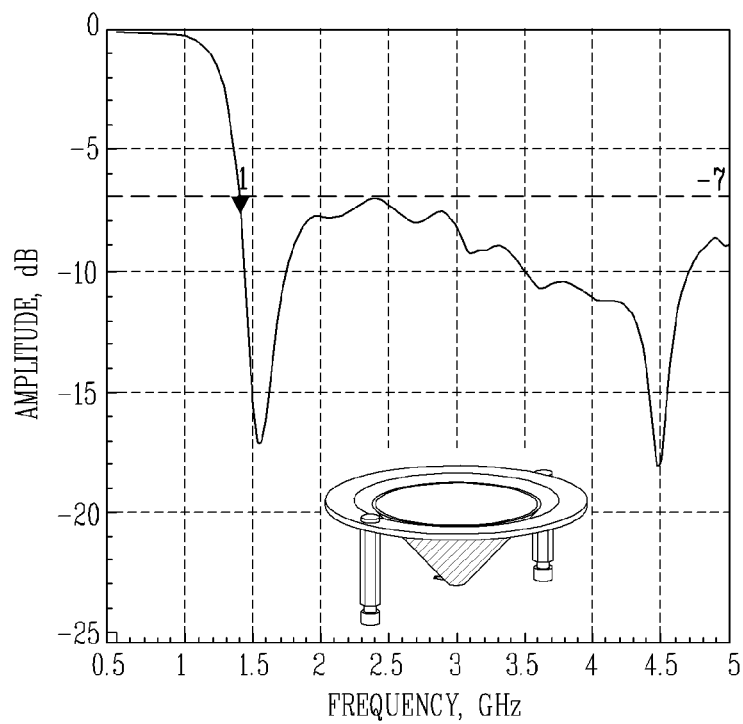

On the other hand, FIGS. 11A and 11B show reflection coefficient characteristics of a cone antenna having a circular patch and shorting pins according to another embodiment of the present disclosure. FIGS. 11A and 11B show reflection coefficient characteristics of a hollow cone antenna having a circular patch and shorting pins. In this regard, FIG. 9B shows the reflection coefficient characteristics of the cone antenna operating from a first frequency (614 MHz). On the contrary, FIGS. 11A and 11B show the reflection coefficient characteristics of the cone antenna operating from a second frequency (800 MHz) and a third frequency (1400 MHz), respectively. Referring to FIGS. 6, 9B, 11A and 11B, it can be seen that the cone antennas having a circular patch and two shorting pins are operable from a first frequency (614 MHz), a second frequency (800 MHz), and a third frequency (1400 MHz), respectively, up to 5 GHz is possible. In this regard, the cone antennas operating from the first frequency (614 MHz), the second frequency (800 MHz), and the third frequency (1400 MHz) will be referred to as a first type cone antenna, a second type cone antenna, and a third type cone antenna, respectively, having a circular patch.

Accordingly, in connection with FIGS. 9B, 11A, and 11B, the dimensions of the first type cone antenna, the second type cone antenna, and the third type cone antenna having a circular patch are shown in Table 3 below. Furthermore, for comparison purposes, Table 3 also presents the dimensions of a cone antenna having a rectangular patch and one shorting pin.

TABLE 3

$1^{st}$ Cone antenna with two shorting pins on circular patch
Cone height: 34 mm (0.07λ) Antenna height: 35 mm (0.07λ)
Cone size: 70 mm (0.14λ) Antenna size: 100 × 100 mm (0.21λ × 0.21λ)
$2^{nd}$ Cone antenna with two shorting pins on circular patch
Cone height: 29 mm (0.08λ) Antenna height: 30 mm (0.08λ)
Cone size: 60 mm (0.16λ) Antenna size: 80 × 80 mm (0.21λ0 × 0.21λ)
$3^{rd}$ Cone antenna with two shorting pins on circular patch
Cone height: 14 mm (0.07λ) Antenna height: 15 mm (0.07λ)
Cone size: 30 mm (0.14λ) Antenna size: 46 × 46 mm (0.21λ × 0.21λ)
Cone antenna with single shorting pin on rectangular patch
Cone height: 15 mm (0.07λ) Antenna height: 16 mm (0.07λ)
Cone size: 26 mm (0.12λ) Antenna size: 32 × 32 mm (0.15λ × 0.15λ)

Referring to the dimensions of the first type cone antenna, the second type cone antenna, and the third type cone antenna having a circular patch in Table 3, they may be scaled to the dimension of the same wavelength. Accordingly, when the lowest frequency in the operating bands is determined, it provides convenience in design that the cone antenna design can be automatically performed according to a wavelength of the corresponding frequency. On the other hand, from the viewpoint of reducing an overall size of the antenna, in the cone antenna structure according to FIGS. 5A to 6B, the cone antenna 1100 in a structure of the rectangular patch 1101 having the single shorting pin 1102 in FIG. 5B can be implemented with the smallest size at the corresponding frequency. Specifically, the cone antenna 1100 in a structure of the rectangular patch 1101 having the single shorting pin 1102 in FIG. 5B can be reduced in size by about 25% (from 0.21λ to 0.15λ) compared to the cone antenna 1100a in a structure of the circular patch 1101a having the two shorting pins 1102a in FIG. 6.

Figure 12A:
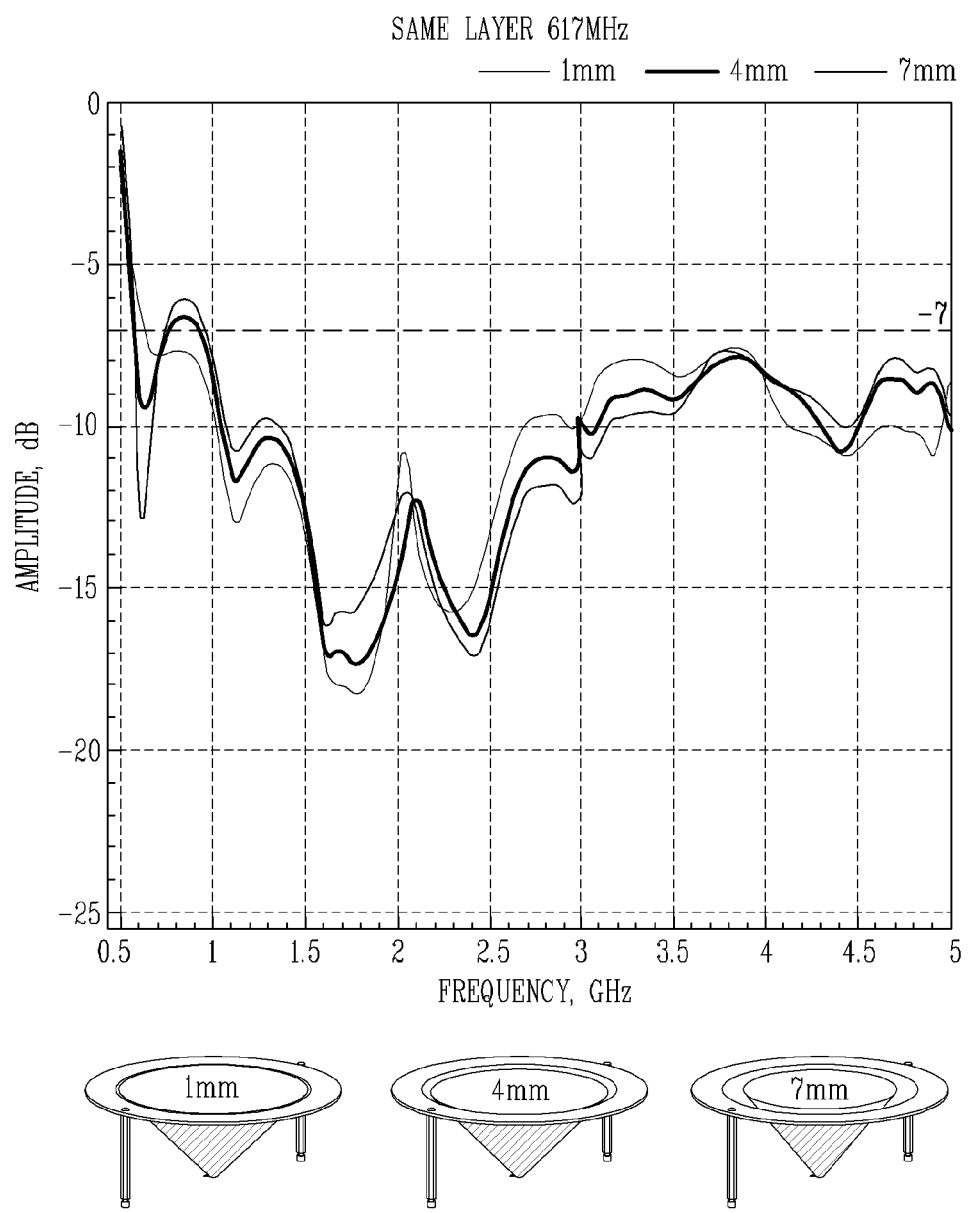
FIGS. 12A and 12B show a change in reflection coefficient characteristics according to a change in a gap between an upper aperture of a cone antenna and a metal patch.
Figure 12B:
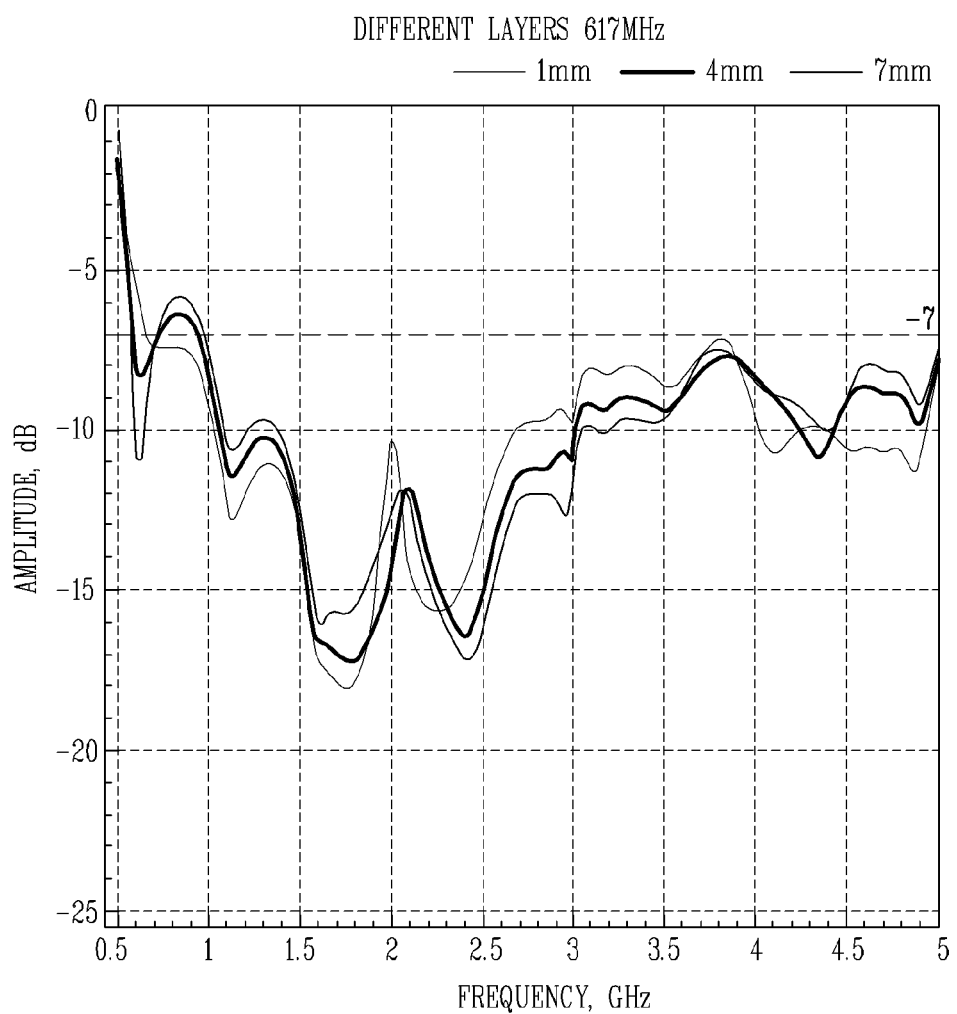
Figure 12B:
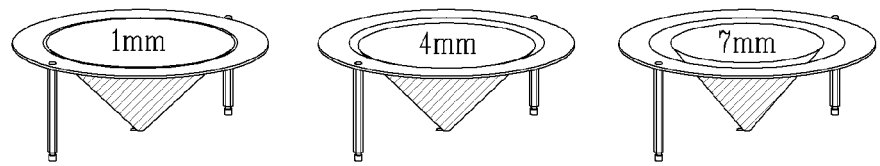

On the other hand, FIGS. 12A and 12B show a change in reflection coefficient characteristics according to a change in a gap between an upper aperture of a cone antenna and a metal patch. Here, a gap between the upper aperture of the cone antenna and the metal patch was changed to 1 mm, 4 mm, and 7 mm, respectively, by 3 mm.

FIG. 12A shows a change in reflection coefficient characteristics according to a change in the gap between the upper aperture and the metal patch when the upper aperture of the cone antenna and the metal patch are disposed on the same layer. Referring to FIGS. 4 and 6, the metal patch 1101a may be disposed on a bottom surface of the first substrate, which is an upper substrate. Furthermore, the outer rim 1103 of the cone antenna 1100a may be connected to the first substrate through the fasteners 1104.

On the contrary, FIG. 12B shows a change in reflection coefficient characteristics according to a change in the gap between the upper aperture and the metal patch when the upper aperture of the cone antenna and the metal patch are disposed on different layers. Referring to FIGS. 4 and 6, the metal patch 1101a may be disposed on a front surface of the first substrate, which is an upper substrate. In addition, the outer rim 1103 of the cone antenna 1100a may be connected to the first substrate through the fasteners 1104. Accordingly, the metal patch 1101a may be disposed above the cone antenna 1100a by a thickness of the first substrate.

Referring to FIGS. 12A and 12B, it can be seen that a change in the reflection coefficient is not large according to a change in the gap between the upper aperture of the cone antenna and the metal patch. Accordingly, it can be seen that a level of coupling between the cone antenna 1100a and the metal patch 1101a is almost negligible. However, in a low frequency band, a coupling between the cone antenna 1100a and the metal patch 1101a may affect a low frequency resonance. Therefore, it is necessary to maintain the gap at a predetermined level or more according to the lowest frequency in the operating band of the cone antenna 1100a, for example, the first frequency (614 MHz) or the third frequency (1400 MHz).

Figure 13A:
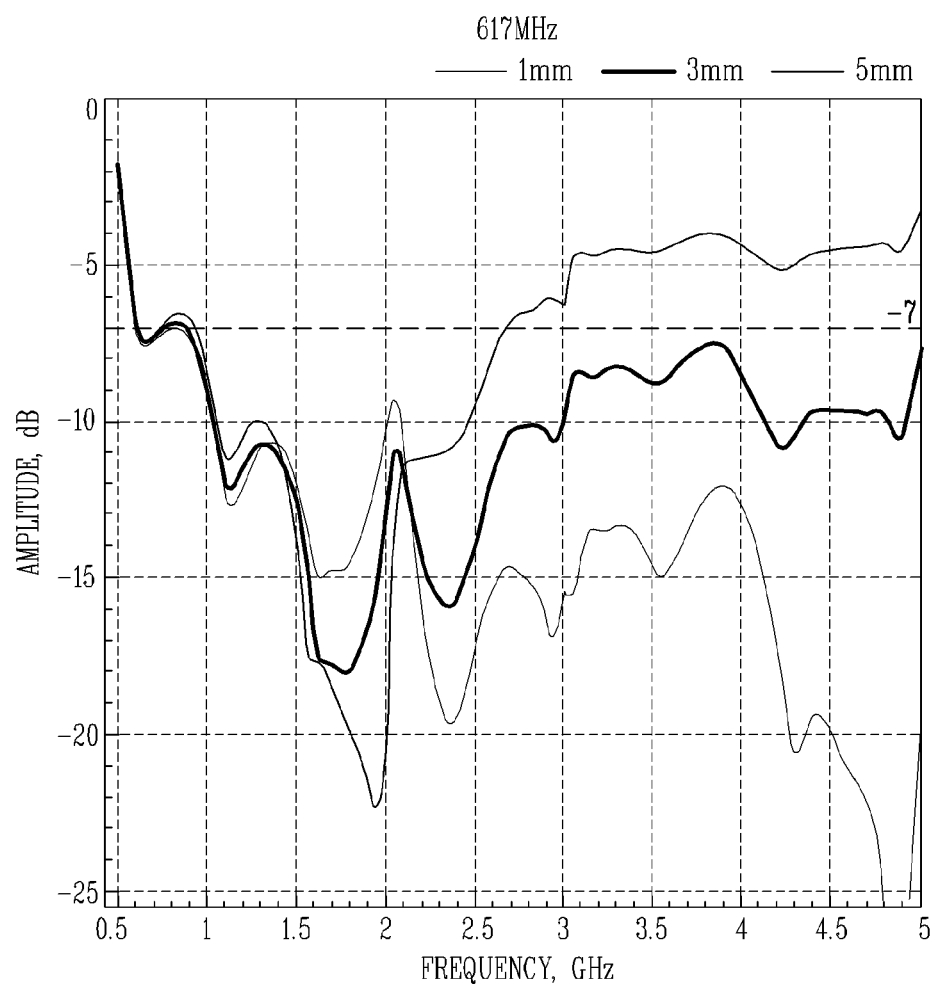
FIGS. 13A and 13B show reflection coefficient characteristics according to a change in a lower diameter of the cone antenna according to the present disclosure.
Figure 13A:
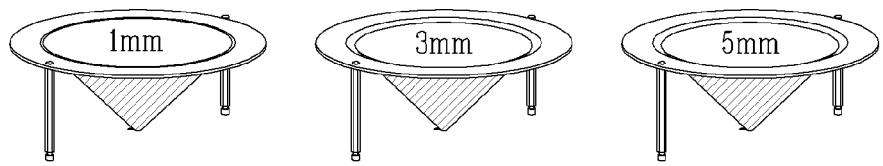
Figure 13B:
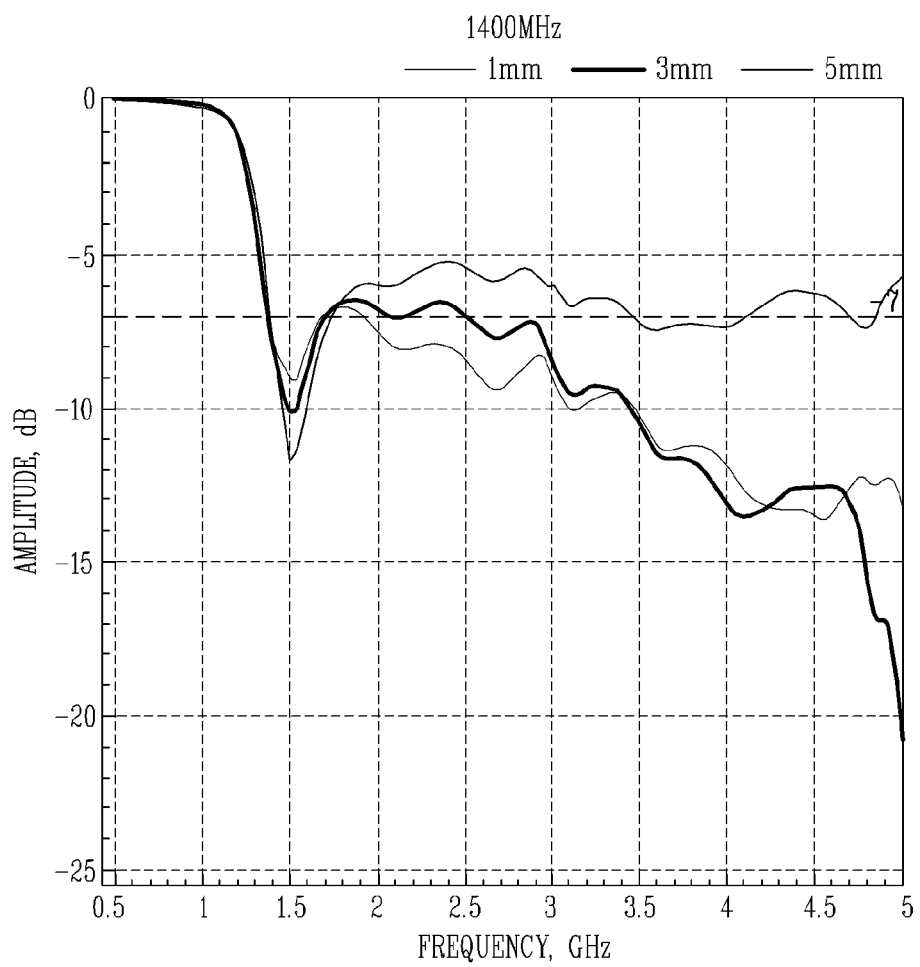
Figure 13B:
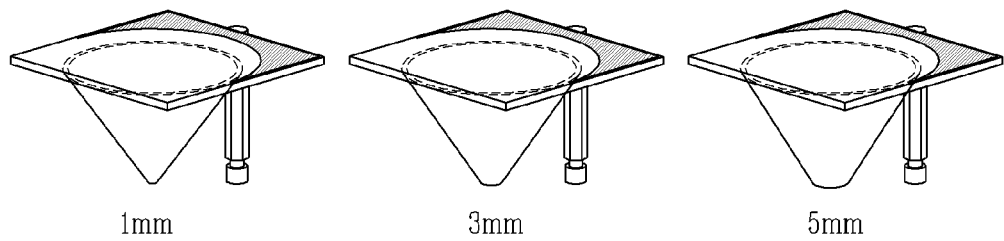

FIGS. 13A and 13B show reflection coefficient characteristics according to a change in a lower diameter of the cone antenna according to the present disclosure. In this regard, FIG. 13A shows reflection coefficient characteristics for a cone antenna having two shorting pins and a circular patch operating from the first frequency (614 MHz). On the contrary, FIG. 13B shows reflection coefficient characteristics for a cone antenna having a single shorting pin and a rectangular patch operating from the third frequency (1400 MHz). Specifically, FIG. 13B corresponds to the cone antenna 1100 having the single shorting pin 1102 and the rectangular patch 1101 in FIGS. 5A and 5B. In FIGS. 13A and 13B, a lower diameter of the cone antenna was changed to 1 mm, 3 mm, and 5 mm, respectively, by 2 mm.

Referring to FIGS. 4 to 6B, 8, 13A, and 13B, it can be seen that matching characteristics in a high frequency band are improved as a size of the lower diameter of the cone antennas 1100, 1100a, 1100b decreases. Furthermore, it can be seen that the bandwidth characteristics are improved as the size of the lower diameter of the cone antennas 1100, 1100a, 1100b decreases.

Figure 14:
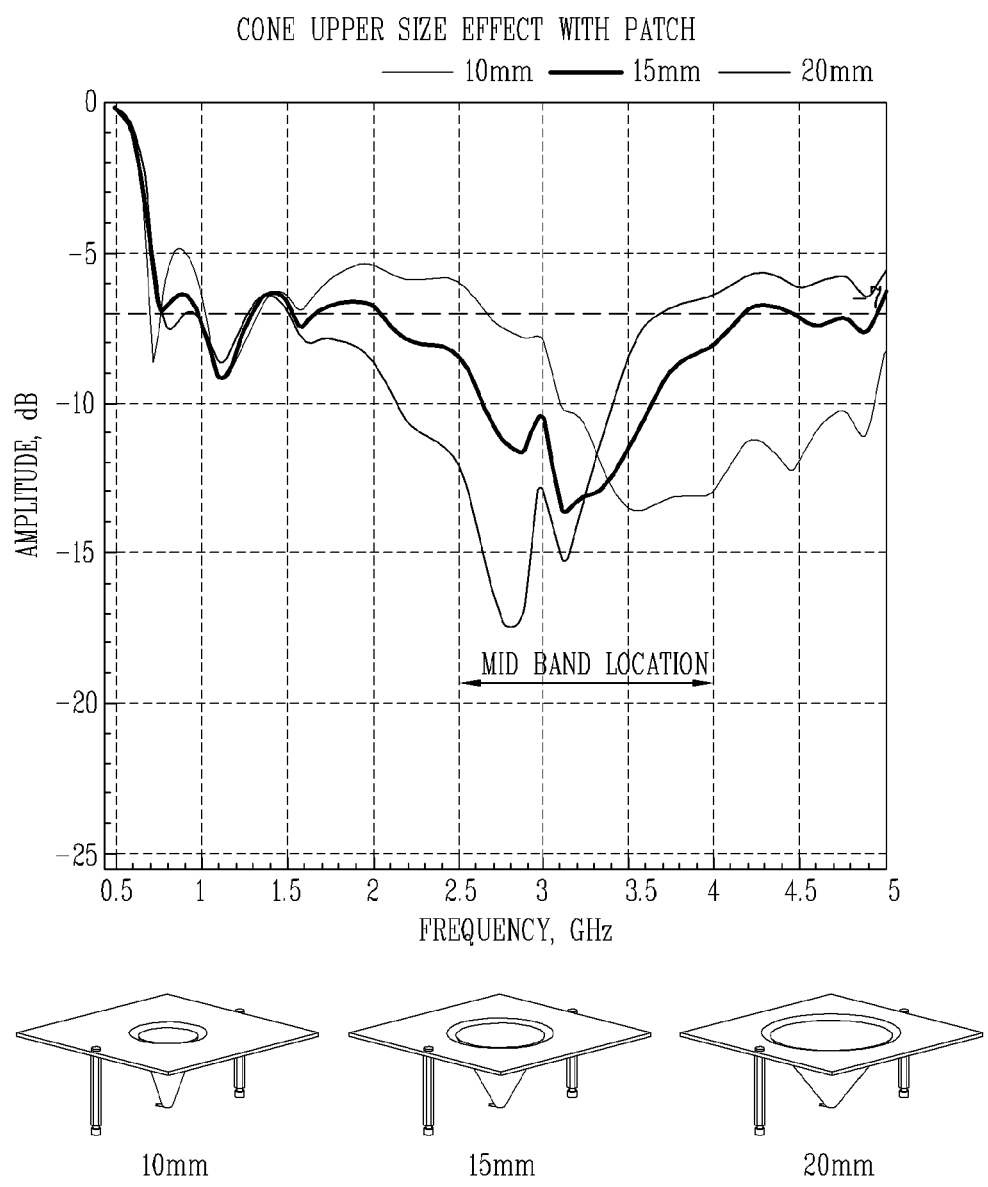
FIG. 14 shows reflection coefficient characteristics according to a change in an upper diameter of the cone antenna according to the present disclosure.

On the other hand, FIG. 14 shows reflection coefficient characteristics according to a change in an upper diameter of the cone antenna according to the present disclosure. Here, a size of the upper diameter of the cone antenna 1100 was changed to 10 mm, 15 mm, and 20 mm, respectively, by 5 mm. In this regard, it can be seen that matching characteristics in a mid band are changed as a size of the upper diameter increases.

In this regard, it can be seen that there is no significant change in the matching characteristics in the low frequency band despite a change in the size of the upper diameter. Accordingly, it can be seen that there is no significant change in the low frequency band characteristics even when a size of the upper aperture is reduced in the cone antenna 1100, 1100a, 1100b according to the present disclosure. Accordingly, there is an advantage in that the cone antenna 1100, 1100a, 1100b can operate in a low frequency band by increasing a size of the metal patch coupled thereto without increasing a size of the cone antenna itself. Accordingly, there is an advantage in that an electronic device having at least one cone antenna can operate up to a low frequency band without increasing the size of the cone antenna itself. As a result, there is an advantage in that an electronic device having at least one cone antenna can reduce its weight and thickness while operating in a wide band.

Figure 15:
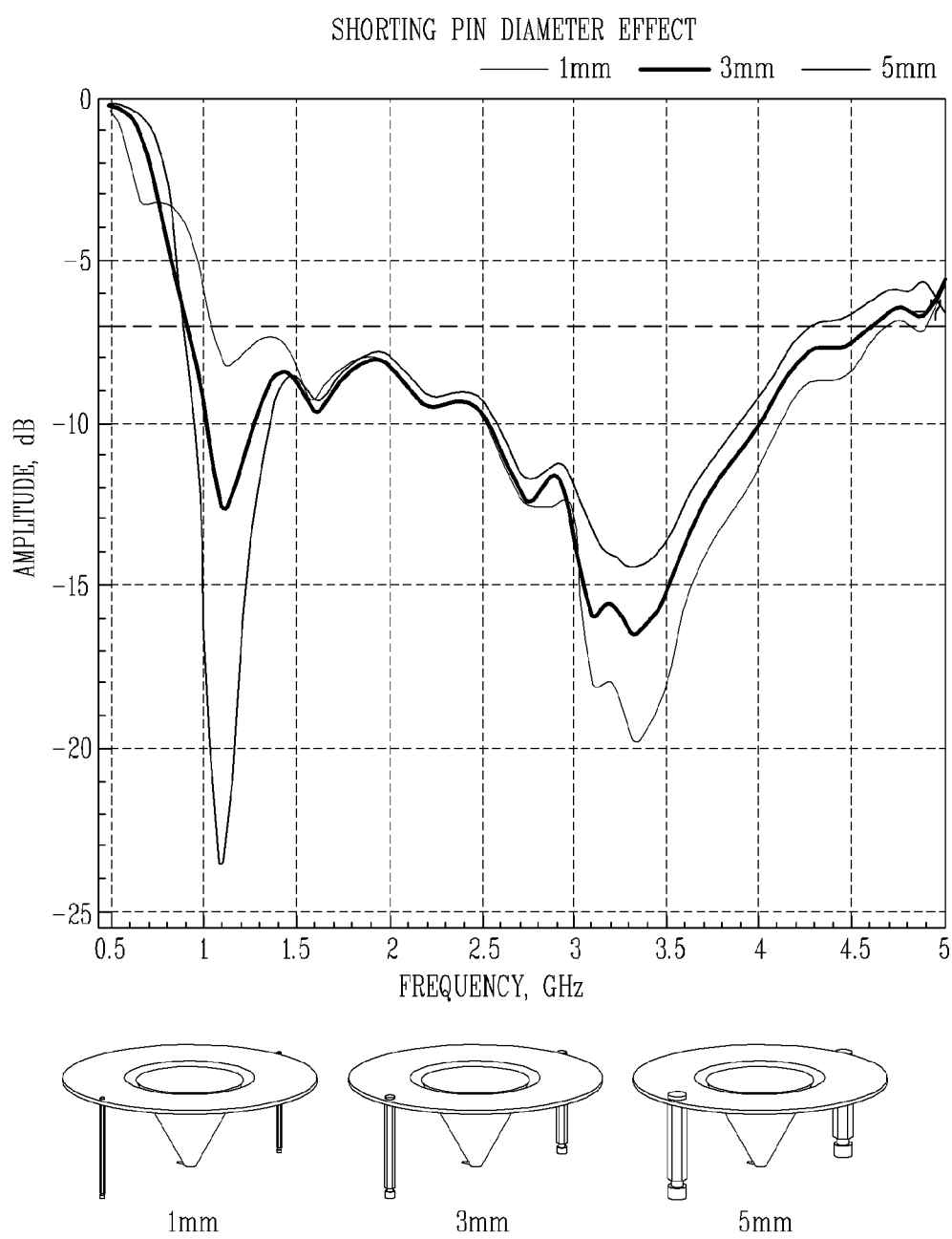
FIG. 15 shows reflection coefficient characteristics according to a change in a diameter of a shorting pin in a circular patch structure.

On the other hand, FIG. 15 shows reflection coefficient characteristics according to a change in a diameter of a shorting pin in a circular patch structure. Here, the number of shorting pins is two, and a diameter of the shorting pin was changed to 1 mm, 3 mm, and 5 mm, respectively, by 2 mm. Referring to FIG. 15, a change in the diameter of the shorting pin has a large effect on the matching characteristics of the low frequency band. In addition, a change in the diameter of the shorting pin has a large effect on the resonant frequency of the low frequency band.

Specifically, it can be seen that as the diameter of the shorting pin increases, the characteristics in the low frequency band are improved, but the characteristics in the middle and high frequency bands are slightly deteriorated. In this regard, it is because it can be equivalent to being electrically short-circuited in the low frequency band when the diameter of the shorting pin increases to a predetermined diameter or more. On the other hand, when the diameter of the shorting pin increases to a predetermined diameter or more, unwanted radiation by the shorting pin itself may occur in the middle and high frequency bands.

Therefore, in the present disclosure, an optimal diameter of the shorting pin for improving performance in the low frequency band can be selected while maintaining a predetermined level of the reflection coefficient characteristics in the middle and high frequency bands. For example, a diameter of the shorting pin can be set to 5 mm for the cone antenna operating from the first frequency (614 MHz) to improve performance in the low frequency band including the first frequency. On the contrary, a diameter of the shorting pin can be set to 1 mm or 3 mm for the cone antenna operating from the third frequency (1400 MHz) to improve performance in the middle and high frequency bands.

In this regard, two different shorting pins may be disposed at different positions to select either one of the shorting pins through a switching element. Specifically, a structure of the rectangular patch 1101 having the single shorting pin 1102 in FIG. 5B may be modified and configured as the rectangular patch 1101 having two shorting pins (first and second shorting pins).

In this case, in order to improve the characteristics of the low frequency band, a diameter of the first shorting pin can be set to a first diameter (e.g., 5 mm). Furthermore, in order to improve the characteristics of the middle and high frequency bands, a diameter of the second shorting pin can be set to a second diameter (e.g., 1 mm or 3 mm). On the other hand, the first and second shorting pins can be configured to be connected to the rectangular patch 1101 at one side and the other side of the rectangular patch 1101 opposing to each other. In addition, first and second switches may be provided to connect the first and second shorting pins to the rectangular patch 1101. In this case, as only the first switch is turned on, the first shorting pin can be connected to the rectangular patch 1101 to improve characteristics in the low frequency band. On the contrary, as only the second switch is turned on, the second shorting pin can be connected to the rectangular patch 1101 to improve characteristics in the middle and high frequency bands. On the other hand, such a switching-type shorting pin structure can be used for the circular patch structure in addition to the rectangular patch structure.

Figure 16A:
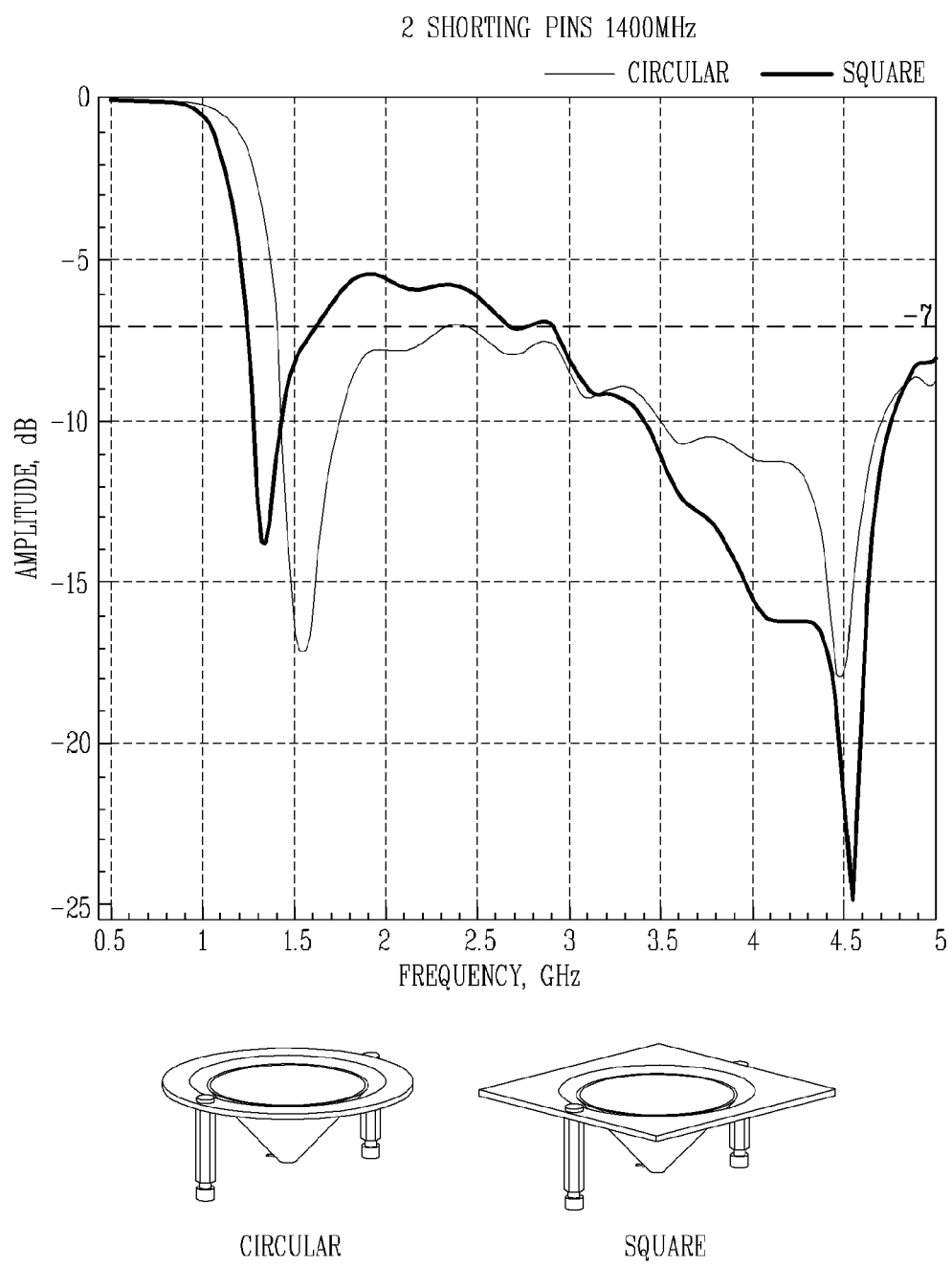
FIGS. 16A and 16B show a change in reflection coefficient characteristics according to a change in a shape of a metal patch in a cone antenna structure according to the present disclosure.
Figure 16B:
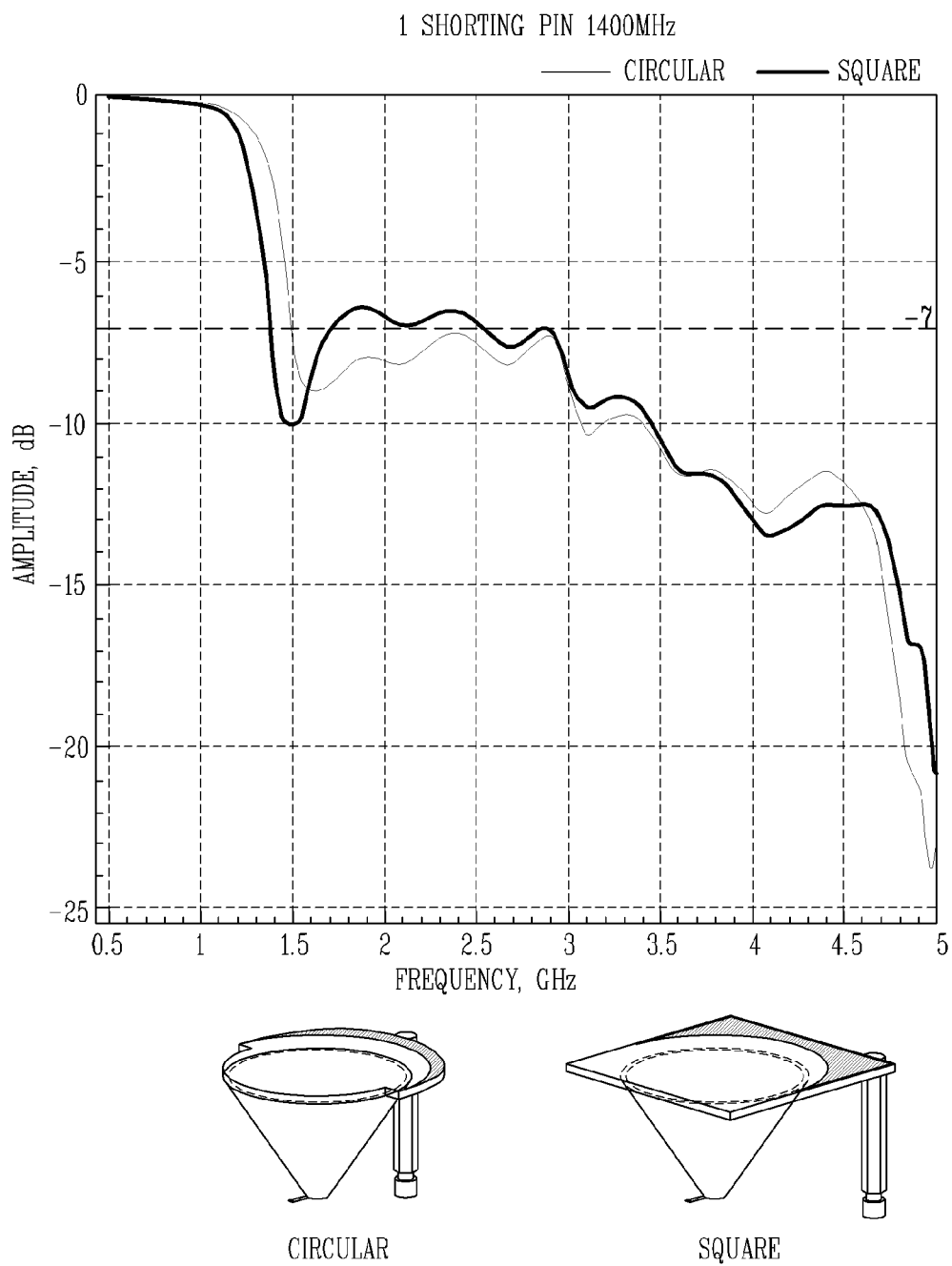

On the other hand, FIGS. 16A and 16B show a change in reflection coefficient characteristics according to a change in a shape of a metal patch in a cone antenna structure according to the present disclosure. FIG. 16A is a comparison of reflection coefficient characteristics in the cone antenna structures having two shorting pins. Specifically, FIG. 16A is a comparison of reflection coefficient characteristics when the metal patch has a circular shape or a rectangular shape, particularly, a square shape.

On the contrary, FIG. 16B is a comparison of reflection coefficient characteristics in the cone antenna structures having one shorting pin. Specifically, FIG. 16B is a comparison of reflection coefficient characteristics when the metal patch has a circular shape or a rectangular shape, particularly, a square shape. In FIGS. 16A and 16B, the cone antenna can be configured to operate from the third frequency (1400 MHz).

Referring to FIG. 16A, when two shorting pins are adopted, it can be seen that the rectangular patch resonates in a lower band than the circular patch to have better overall bandwidth characteristics. Furthermore, it can be seen that the rectangular patch has better bandwidth characteristics in the high frequency band than the circular patch.

On the contrary, referring to FIG. 16B, it can be seen that there is no significant change in the characteristics of the circular patch and the rectangular patch when a single shorting pin is adopted. On the other hand, the size of the circular patch is generally smaller than that of the rectangular patch. However, since the size of the cone antenna itself increases in the circular patch structure, an entire size of the antenna may rather increase. Accordingly, the rectangular patch structure, which is advantageous in terms of the overall size of the antenna, may be more advantageous.

Figure 17A:
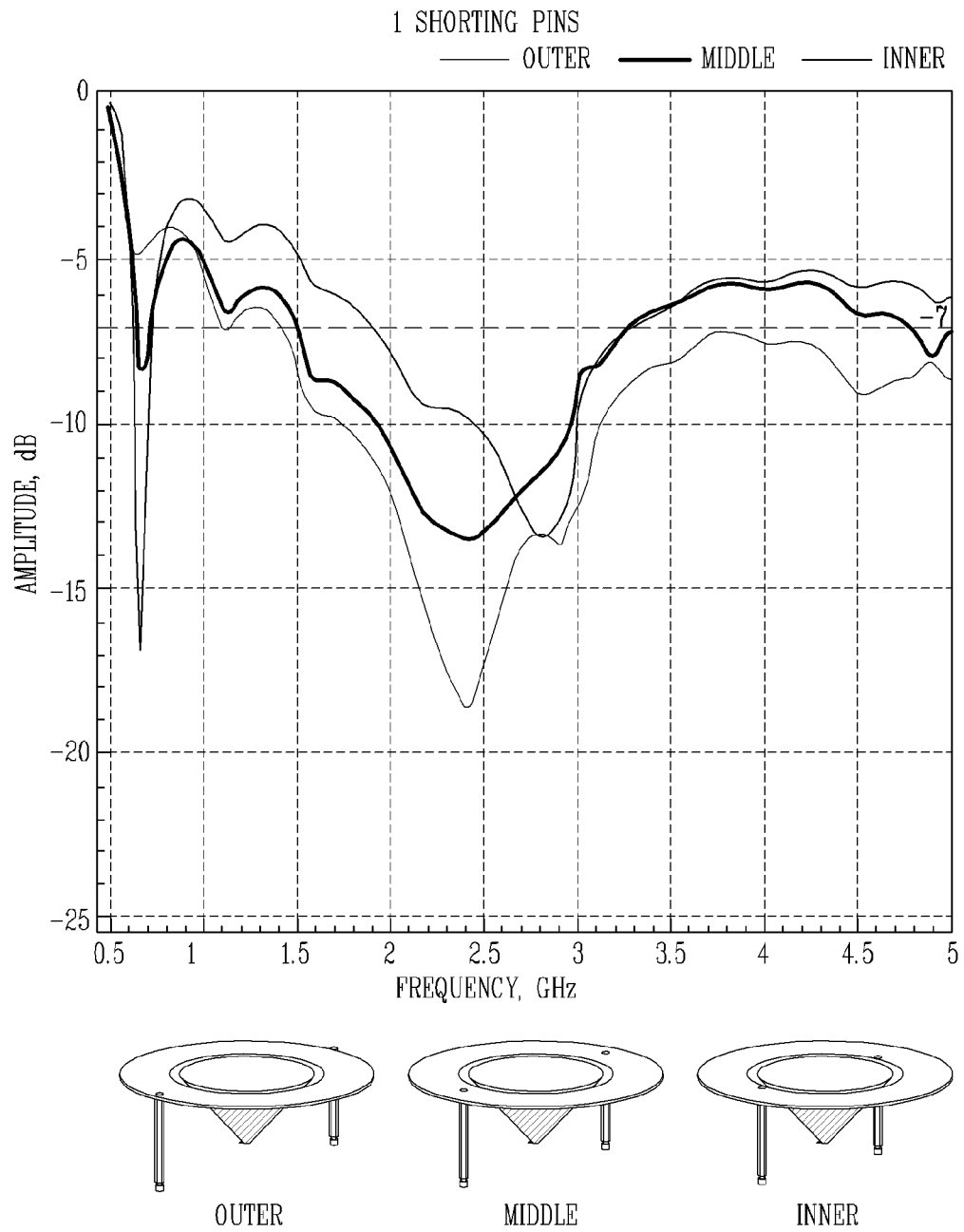
FIGS. 17A and 17B show a change in reflection coefficient characteristics according to a shorting pin position in the cone antenna structure according to the present disclosure.
Figure 17B:
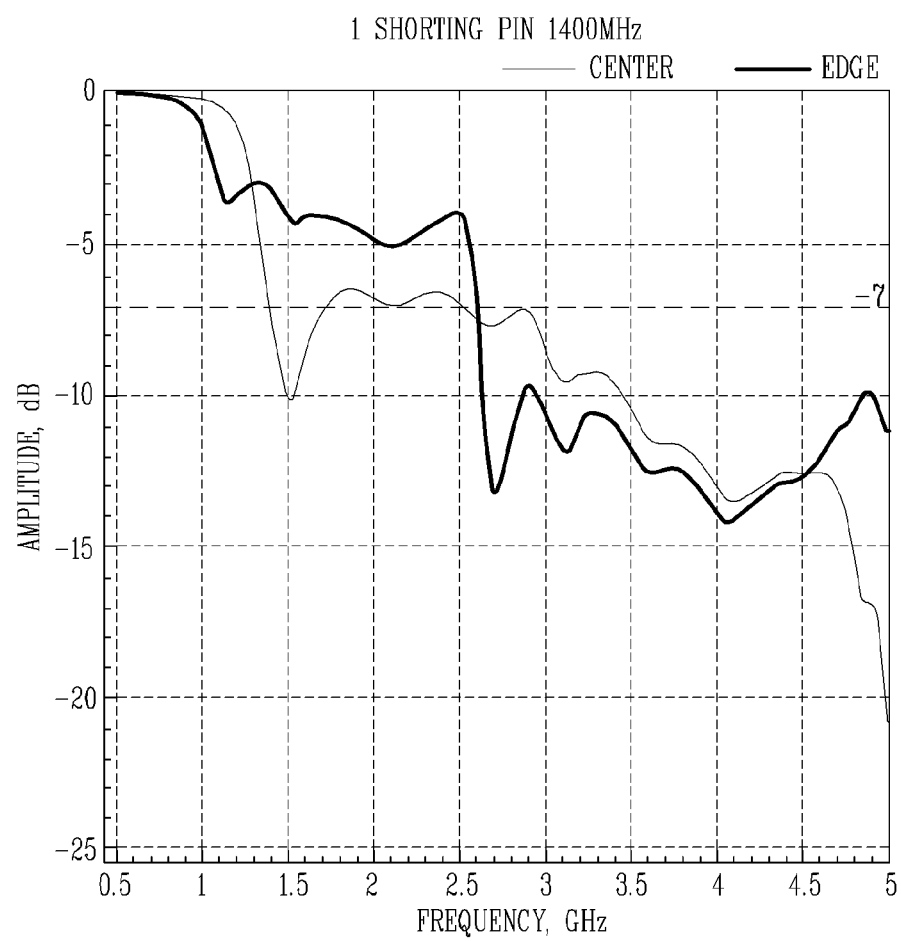
Figure 17B:
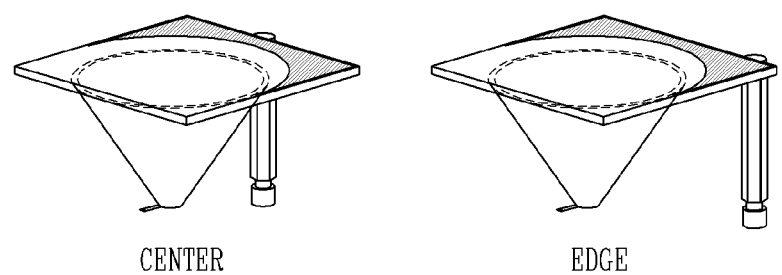

FIGS. 17A and 17B show a change in reflection coefficient characteristics according to a shorting pin position in the cone antenna structure according to the present disclosure. FIG. 17A shows a change in reflection coefficient characteristics according to relative shorting pin positions (outer, middle, inner) in an inner region of the circular patch in the circular patch structure having two shorting pins. On the other hand, FIG. 17B shows a change in reflection coefficient characteristics according to the relative shorting pin positions (center, edge) in an inner region of the rectangular patch in the rectangular patch structure having a single shorting pin.

Referring to FIG. 17A, it can be seen that the shorting pin positions affect the low and middle frequency bands. Specifically, when the shorting pins are disposed in an outer region of the circular patch, bandwidth performance can be improved in the middle frequency band. On the contrary, when the shorting pins are disposed in an inner region of the circular patch, resonance characteristics are improved in the low frequency band. Accordingly, the positions of the shorting pins in the cone antenna operating from the first frequency (614 MHz) is advantageously disposed at an inner side of the metal patch. On the contrary, in the cone antenna operating from the third frequency (1400 MHz), the positions of the shorting pins are advantageously disposed at an outer side of the metal patch.

In addition, referring to FIG. 17B, from the viewpoint of low frequency band performance, the positions of the shorting pins are advantageously disposed at the center of one side rather than at an edge region of one side in the rectangular patch. In this regard, the structure of FIG. 17B is a ring antenna with a rectangular patch structure having a single shorting pin operating from the third frequency (1400 MHz).

Figure 18A:
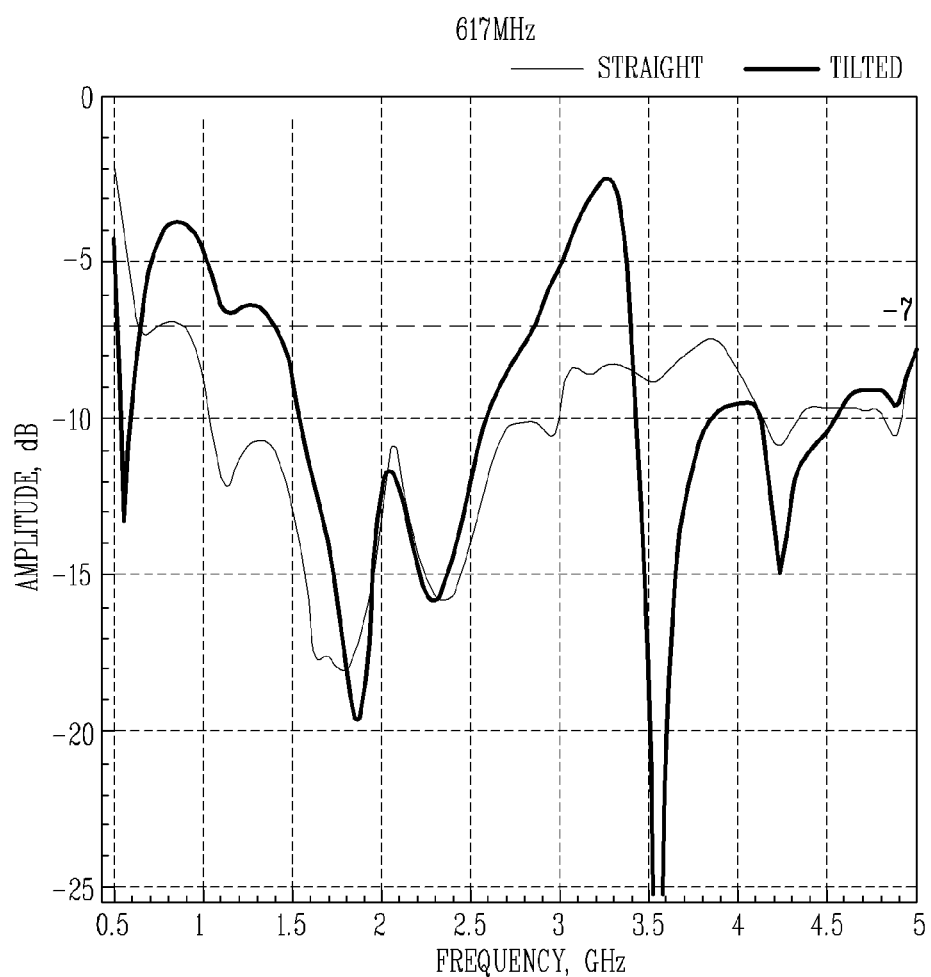
FIGS. 18A and 18B show a change in reflection coefficient characteristics according to a structure in which a shorting pin is formed in the cone antenna structure according to the present disclosure.
Figure 18A:
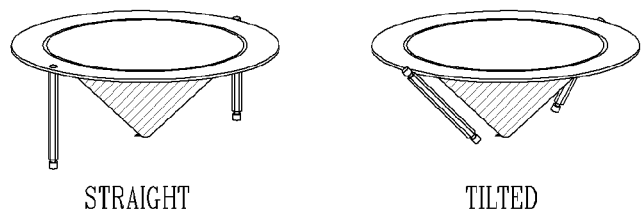
Figure 18B:
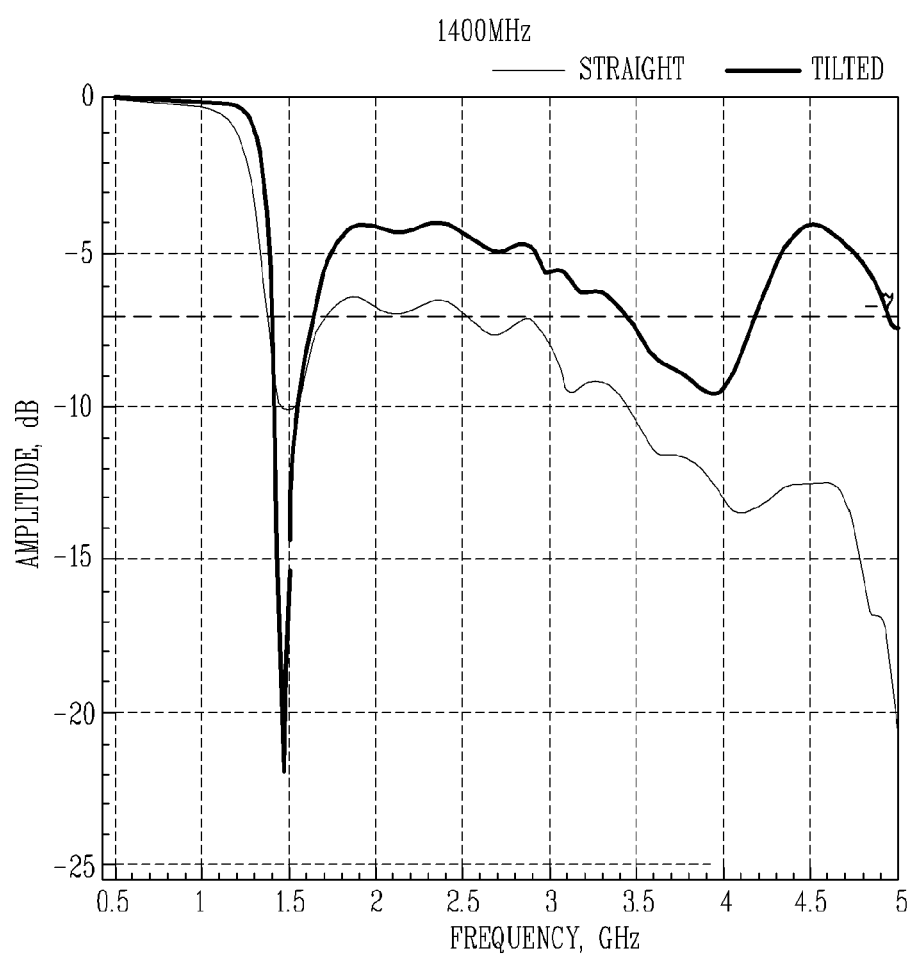
Figure 18B:
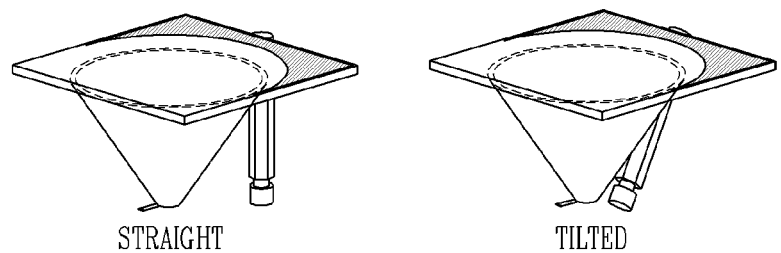

FIGS. 18A and 18B show a change in reflection coefficient characteristics according to a structure in which a shorting pin is formed in the cone antenna structure according to the present disclosure. Specifically, a structure in which the shorting pin is connected in a straight form to the first substrate, which is an upper substrate, and the second substrate, which is a lower substrate, is compared with a structure in which the shorting pin is connected in a tilted form.

FIG. 18A is a structure of the cone antenna operating from the first frequency (614 MHz), and FIG. 18B is a structure of the cone antenna operating from the third frequency (1400 MHz). In this regard, the tilted form of the shorting pin may be a form corresponding to a slope of a line connecting the upper aperture and the lower aperture of the cone antenna.

Referring to FIGS. 18A and 18B, it can be seen that the reflection coefficient characteristic is better on average in the entire frequency band when the shorting pin is connected in a straight form than when the shorting pin is connected in a tilt form. Accordingly, in a short effect by the shorting pin, contribution providing the short effect to the metal patch is dominant over contribution providing the shorting effect to the cone antenna.

Figure 19A:
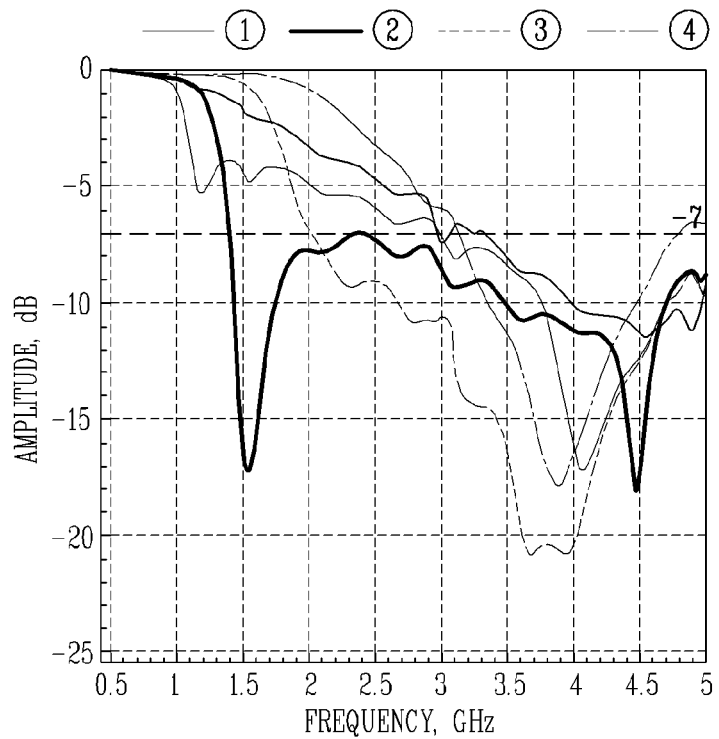
FIGS. 19A to 19C show reflection coefficient characteristics and gain changes according to a change in the number of shorting pins according to the present disclosure.
Figure 19B:
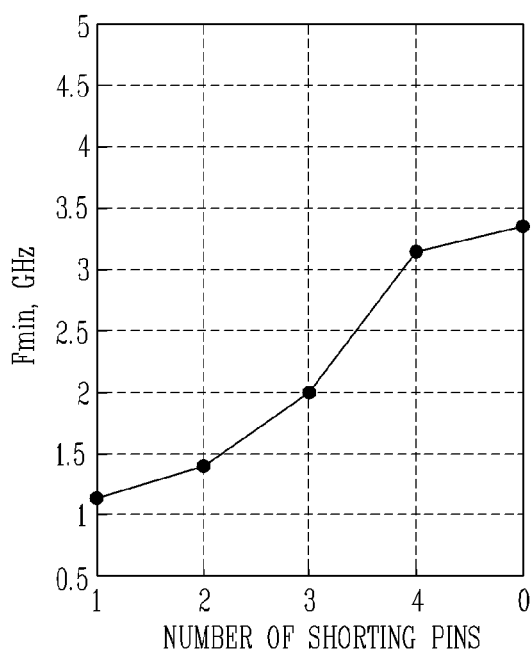
Figure 19C:
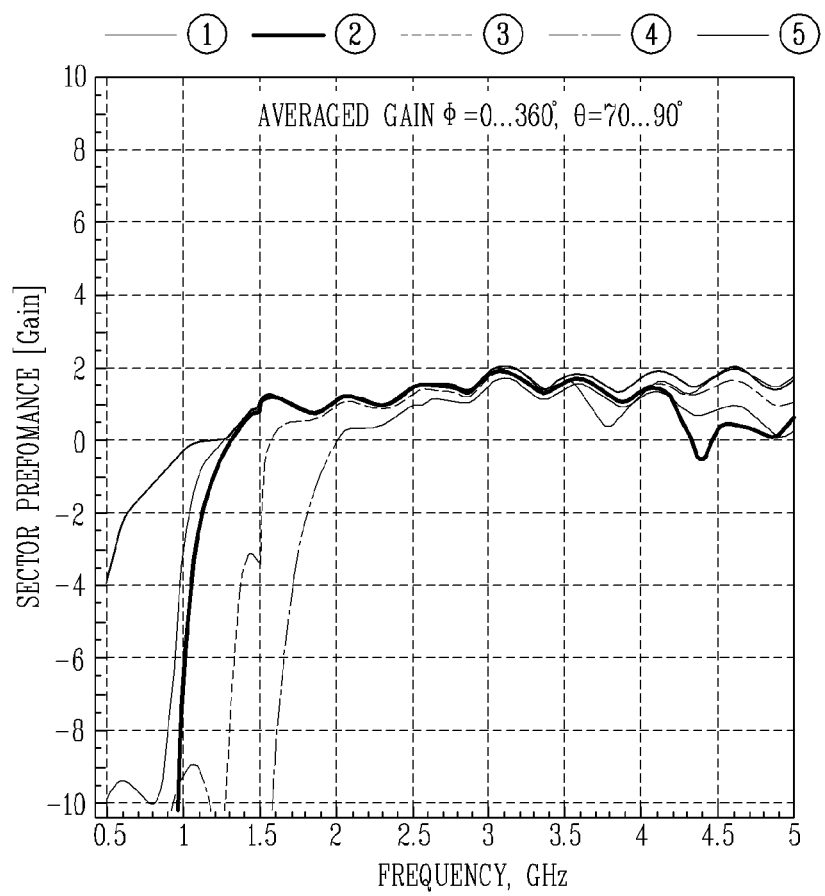

FIGS. 19A to 19C show reflection coefficient characteristics and gain changes according to a change in the number of shorting pins according to the present disclosure. Specifically, FIG. 19A shows a change in reflection coefficient characteristics according to a change in the number of shorting pins. In this regard, FIG. 19A is a simulation result for the cone antenna 1000*a* having the circular patch 1101*a* as shown in FIG. 5A or 6A. On the other hand, as the number of shorting pins increases to 2, 3, or 4, the shorting pins may be disposed at intervals of 180, 120, or 90 degrees. Meanwhile, when the number of shorting pins is one, the form of the circular patch 1101*a* may be disposed at only one side.

Referring to FIG. 19A, it can be seen that the reflection coefficient is significantly changed in the low frequency band according to a change in the number of shorting pins. In particular, in the case of one or two shorting pins, double resonance occurs, and thus the cone antenna exhibits wideband characteristics. However, when the number of shorting pins is increased to three or four, double resonance does not occur, and thus the cone antenna exhibits narrowband characteristics.

Meanwhile, FIG. 19B shows a change in the minimum resonant frequency Frmin according to an increase in the number of shorting pins. Referring to FIG. 19B, as the number of shorting pins increases from one to four, the minimum resonant frequency increases. Therefore, as the number of shorting pins increases from 1 to 4, the overall bandwidth decreases. In this regard, when the number of shorting pins is one and the minimum resonant frequency is 1.1 GHz, the cone antenna can operate from 1.1 GHz to 5 GHz. On the other hand, when the number of shorting pins is two and the minimum resonant frequency is 1.4 GHz, the cone antenna can operate from 1.4 GHz to 5 GHz. On the contrary, when the number of shorting pins is 4 and the minimum resonant frequency is 3.2 GHz, the cone antenna can operate from 3.2 GHz to 5 GHz.

Meanwhile, FIG. 19C shows gain characteristics according to a change in the number of shorting pins for each frequency. Referring to FIG. 19C, as the number of shorting pins increases, the gain of the cone antenna decreases in the low frequency band. Therefore, one or two shorting pins may be used in order to reduce an overall size of the antenna while maintaining the gain of the cone antenna at a predetermined level in the low frequency band.

In the above, a structure of the cone antenna with various structures according to the present disclosure and a simulation result thereof have been described. Hereinafter, a configuration of an electronic device having cone antennas in the present disclosure will be described. On the other hand, the structure of the cone antenna with various structures according to the present disclosure described above and a simulation result thereof may be applicable to the following description.

Figure 20A:
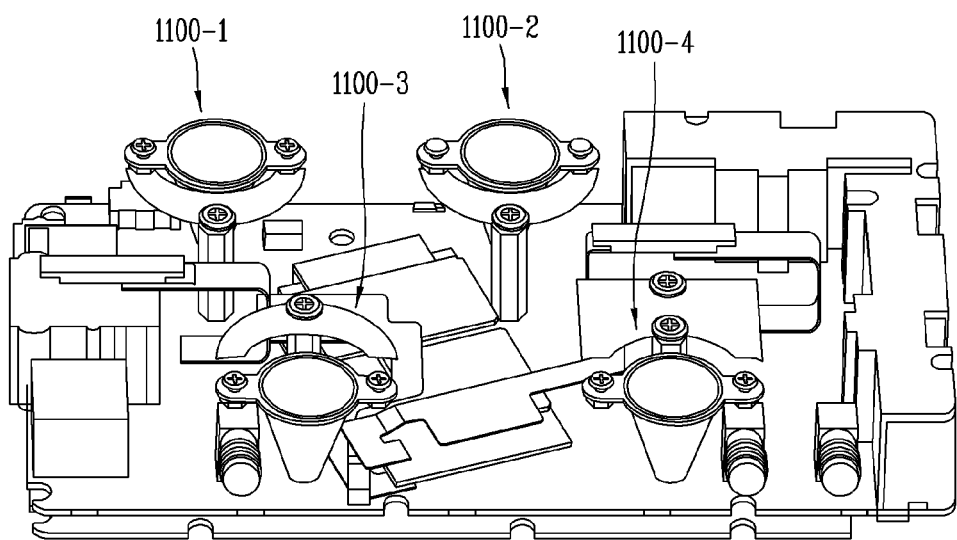
FIG. 20A shows a shape of an electronic device having a plurality of cone antennas according to the present disclosure.

In this regard, FIG. 20A shows a shape of an electronic device having a plurality of cone antennas according to the present disclosure. Furthermore, FIG. 20B shows a structure of an electronic device having a plurality of cone antennas, a transceiver circuit, and a processor according to the present disclosure.

Referring to FIG. 20A, the electronic device may include four cone antennas, that is, a first cone antenna 1100-1 to a fourth cone antenna 1100-4. Here, the number of cone antennas can be changed to various numbers according to applications. Here, referring to FIGS. 5A to 8 and 20A, the first cone antenna 1100-1 to the fourth cone antenna 1100-4 may be implemented in the same shape for the same antenna performance. In addition, the first cone antenna 1100-1 to the fourth cone antenna 1100-4 may be implemented in different shapes for optimal antenna performance and an optimal arrangement structure.

Here, the electronic device may be implemented in a communication relay apparatus, a small cell base station, a base station, or the like in addition to a user terminal (UE). Here, the communication relay apparatus may be customer premises equipment (CPE) capable of providing a 5G communication service indoors.

Figure 20B:
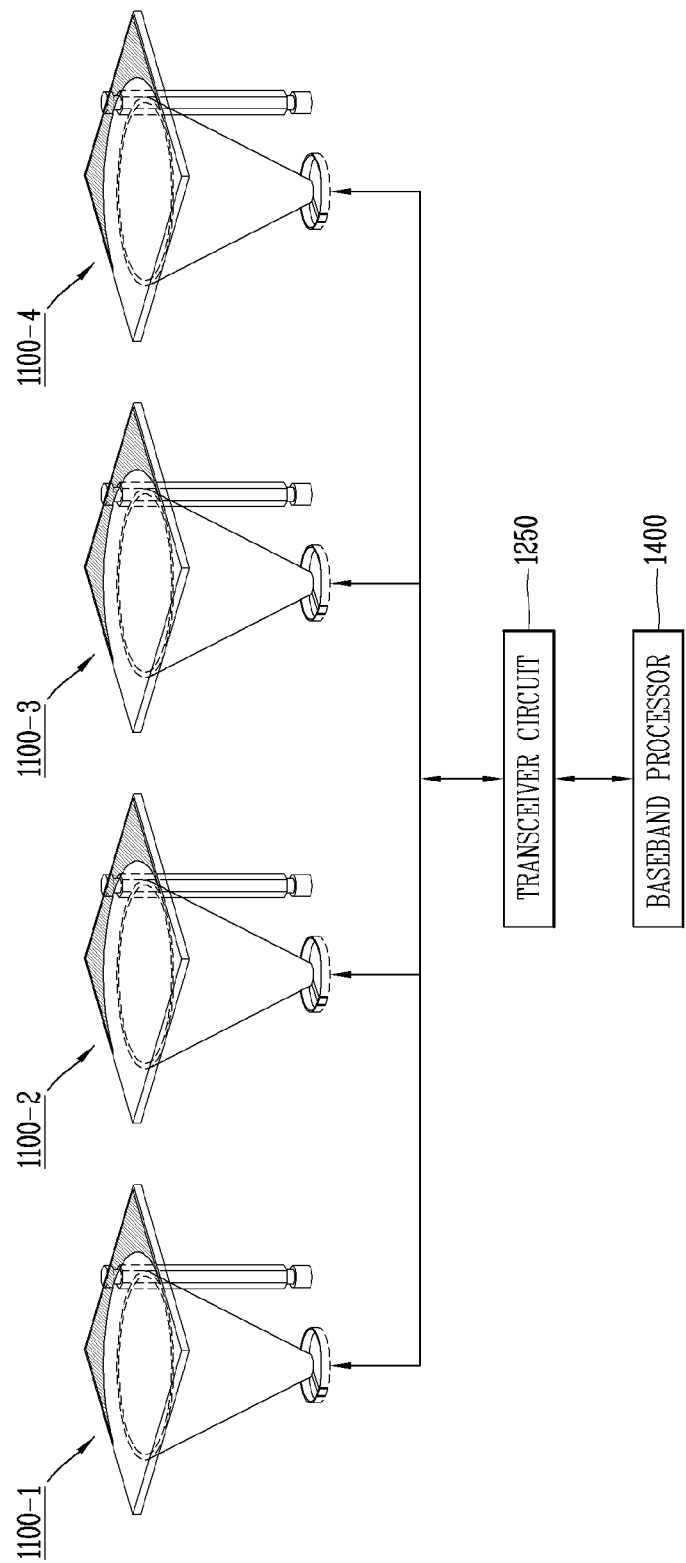
FIG. 20B shows a structure of an electronic device having a plurality of cone antennas, a transceiver circuit, and a processor according to the present disclosure.

On the other hand, referring to FIG. 20B, the electronic device includes a plurality of cone antennas, for example, the first cone antenna 1100-1 to the fourth cone antenna 1100-4. Furthermore, the electronic device may further include the transceiver circuit 1250. Furthermore, the electronic device may further include a processor 1400. Here, the processor 1400 may be a baseband processor configured to control the transceiver circuit 1250.

Meanwhile, referring to FIGS. 5A to 8, 20A and 20B, the cone antennas 1100-1 to 1100-4 each may include the metal patch 1101, 1101', 1101a, 1101b, the cone radiator 1100R, and the power feeder 1105.

The cone radiator 1100R is disposed to connect the first substrate S1 and the second substrate S2 spaced apart from the first substrate S1 by a predetermined gap. In addition, the cone radiator 1100R may include an upper aperture and a lower aperture.

Meanwhile, the metal patch 1101, 1101', 1100a, 1100b may be disposed on the first substrate S1 to be spaced apart from the upper aperture. Furthermore, the power feeder 1105 may be disposed on the second substrate S2, and an end portion thereof may be defined in a ring shape to correspond to a shape of the lower aperture so as to transmit a signal through the lower aperture.

In addition, the cone antennas 1100-1 to 1100-4 may further include the shorting pin 1102, 1102a, 1102b. Here, the shorting pin 1102, 1102a, 1102b is configured to connect the metal patch 1101, 1101a, 1101b and the ground layer GND disposed on the second substrate. On the other hand, the shorting pin 1102 may be provided with a single shorting pin between the metal patch 1101, 1101' and the second substrate S2. By such a single shorting pin 1102, a null of a radiation pattern of the cone antenna may be prevented from being generated.

Meanwhile, the power feeder 1105 may be configured in a ring shape corresponding to a shape of a lower region of the cone antennas 1100-1 to 1100-4. Furthermore, the cone antenna 1100 according to the present disclosure may further include a fastener 1107 configured to be connected to the second substrate S2 through an inside of an end portion of the power feeder 1105. Accordingly, the second substrate S2 on which the power feeder 1105 is disposed and the cone radiator 1100R may be fixed through the fastener 1107.

Meanwhile, the metal patch 1101', 1101b may be defined as a rectangular patch having an outer side shape in a rectangular form. Alternatively, the metal patch 1101a may be defined as a circular patch having an outer side shape in a circular form. In this regard, an inner side shape of the rectangular patch 1101', 1101b may be disposed in a circular shape to correspond to a shape of an outer line of the upper aperture. Accordingly, an inner side shape of the rectangular patch 1101', 1101b may be disposed in a circular shape to allow a signal radiated from the cone antennas 1100-1 to 1100-4 to be coupled through an inner side of the rectangular patch 1101', 1101b.

On the other hand, the metal patch 1101, 1101' may be disposed in only a partial region to surround a partial region of the upper aperture of the cone antenna 1100. Accordingly, an overall antenna size including the cone antennas 1100-1 to 1100-4 including the metal patch 1101, 1101' may be minimized.

Meanwhile, the cone antennas 1100-1 to 1100-4 can be disposed between the first substrate, which is an upper substrate, and the second substrate, which is a lower substrate. On the other hand, the transceiver circuit 1250 may be connected to the cone antennas 1100-1 to 1100-4 to control a signal to be radiated through at least one of the cone antennas 1100-1 to 1100-4. Specifically, the transceiver circuit 1250 may be connected to the cone radiator 1100R through the power feeder 1105, and may control a signal to be radiated through the cone antenna 1100.

Meanwhile, the metal patch 1101, 1101a, 1101b may be formed (disposed) in a surrounding region of one side of the upper aperture of the cone antennas 1100-1 to 1100-4. Furthermore, the power feeder 1105 is disposed on the second substrate, and is configured to transmit a signal through a lower part of the cone antenna 1100-1 to 1100-4.

On the other hand, an arrangement structure of a plurality of cone antennas and a signal transceiving method through the arrangement structure are as follows. In this regard, the cone antennas 1100-1 to 1100-4 may be disposed on an upper left, an upper right, a lower left, and a lower right of the electronic device. The arrangement form of the cone antennas 1100-1 to 1100-4 is preferably configured to maximize a separation distance between the cone antennas in the electronic device. Accordingly, mutual interference between the cone antennas 1100-1 to 1100-4 is minimized, which is advantageous in a multi-input multi-output (MIMO) or diversity operation.

In this regard, the processor 1400 may be configured to control the operation of the transceiver circuit 1250. In particular, the processor 1400 may control the transceiver circuit 1250 to perform multi-input multi-output (MIMO) through the cone antennas 1100-1 to 1100-4.

In the above, an electronic device having a cone antenna according to the present disclosure has been described. The technical effects of an electronic device having such a cone antenna will be described as follows.

According to the present disclosure, a hollow cone antenna may be disposed in an electronic device, thereby having an advantage capable of reducing a weight of the electronic device.

Furthermore, according to the present disclosure, a metal patch disposed adjacent to the cone antenna may be connected to a single shorting pin, thereby having an advantage capable of improving reception performance in almost all directions.

Furthermore, according to the present disclosure, the cone antenna having the shorting pin and the metal patch may be connected between an upper and lower substrates in the electronic device, thereby having an advantage capable of allowing a broadband antenna to be disposed in the electronic device.

Furthermore, according to the present disclosure, the metal patch may be disposed on only one side of an upper aperture of the cone antenna, thereby having an advantage capable of minimizing an overall size of the antenna.

Furthermore, according to the present disclosure, metal patches with various shapes may be disposed around an upper aperture of the cone antenna, thereby having an advantage capable of providing a broadband antenna with an optimal structure according to the operating frequency and design conditions of the antenna.

Furthermore, according to the present disclosure, a region where the metal patch is disposed in an upper region of the cone antenna and the number of shorting pins may be optimized, thereby having an advantage capable of optimizing the characteristics of the antenna as well as minimizing the overall size of the antenna.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the aforementioned present disclosure, design and operations of a plurality of cone antennas and a configuration for controlling those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An electronic device having an antenna, the electronic device comprising:
a cone antenna comprising:
a first substrate;
a second substrate spaced apart from the first substrate by a predetermined gap and provided with a ground layer;
a cone radiator provided between the first substrate and the second substrate, an upper part of which is connected to the first substrate, a lower part of which is connected to the second substrate, and provided with an upper aperture on the upper part;
a metal patch disposed on the first substrate, and spaced apart from the upper aperture; and
a shorting pin disposed to electrically connect the metal patch and the ground layer of the second substrate;
at least one non-metal supporter configured to vertically connect the first substrate and the second substrate so as to support the first substrate and the second substrate; and
a transceiver circuit connected to the cone radiator through a power feeder to control a signal to be radiated through the cone antenna,
wherein the metal patch is disposed on one side so as to surround a partial region of an upper opening of the cone antenna to minimize a size of the cone antenna including the metal patch.

2. The electronic device of claim 1, wherein the shorting pin is defined as a single shorting pin between the metal patch and the second substrate, and
a null of a radiation pattern of the cone antenna is prevented from being generated by the single shorting pin.

3. The electronic device of claim 1, further comprising:
the power feeder disposed on the second substrate, and configured to transmit the signal through a lower aperture,
wherein an end portion of the power feeder is defined in a ring shape to correspond to a shape of the lower aperture.

4. The electronic device of claim 3, further comprising:
a fastener configured to be connected to the second substrate through an inside of the end portion of the power feeder,
wherein the second substrate on which the power feeder is disposed and the cone radiator are fixed through the fastener.

5. The electronic device of claim 1, wherein the metal patch is disposed on both the one side and an opposite side corresponding to the one side so as to surround an entire region of the upper opening of the cone antenna.

6. An electronic device having an antenna, the electronic device comprising:
a cone antenna comprising:
a cone radiator configured to connect a first substrate and a second substrate spaced apart from the first substrate by a predetermined gap, and provided with an upper aperture and a lower aperture;
a metal patch disposed on the first substrate, and spaced apart from the upper aperture; and
a power feeder disposed on the second substrate, and configured to transmit a signal through the lower aperture;
at least one non-metal supporter configured to vertically connect the first substrate and the second substrate so as to support the first substrate and the second substrate; and
a transceiver circuit connected to the cone radiator through the power feeder to control a signal to be radiated through the cone antenna,
wherein the metal patch is disposed on one side so as to surround a partial region of an upper opening of the cone antenna to minimize a size of the cone antenna including the metal patch.

7. The electronic device of claim 6, wherein the cone antenna is implemented with a plurality of cone antennas disposed on an upper left, an upper right, a lower left and a lower right of the electronic device,
the electronic device comprising a processor that controls an operation of the transceiver circuit, and
wherein the processor controls the transceiver circuit to perform multi-input multi-output (MIMO) through the plurality of cone antennas.

8. The electronic device of claim 6, further comprising:
a shorting pin that connects between the metal patch and a ground layer of the second substrate,
wherein an end portion of the power feeder is defined in a ring shape to correspond to a shape of the lower aperture.

9. The electronic device of claim 8, wherein the shorting pin is defined as a single shorting pin between the metal patch and the second substrate, and
a null of a radiation pattern of the cone antenna is prevented from being generated by the single shorting pin.

10. The electronic device of claim 6, further comprising:
a fastener configured to be connected to the second substrate through an inside of an end portion of the power feeder,
wherein the second substrate on which the power feeder is disposed and the cone radiator are fixed through the fastener.

* * * * *